(12) United States Patent
Orawetz et al.

(10) Patent No.: US 9,100,994 B2
(45) Date of Patent: Aug. 4, 2015

(54) HEATING SYSTEM HAVING AT LEAST ONE ELECTROTHERMAL HEATING LAYER, A STRUCTURAL COMPONENT HAVING SUCH A HEATING LAYER, A HEATING METHOD AND A METHOD FOR PRODUCING A SEMI-FINISHED COMPONENT OR A COMPONENT HAVING A HEATING DEVICE

(75) Inventors: Holger Orawetz, Dresden (DE); Matti Reppe, Dresden (DE); York Caesar Roth, Bristol (GB); Martin Latrille, Toulouse (FR)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 1057 days.

(21) Appl. No.: 13/124,275

(22) PCT Filed: Oct. 14, 2009

(86) PCT No.: PCT/EP2009/007381
§ 371 (c)(1),
(2), (4) Date: Aug. 12, 2011

(87) PCT Pub. No.: WO2010/049063
PCT Pub. Date: May 6, 2010

(65) Prior Publication Data
US 2011/0290784 A1 Dec. 1, 2011

Related U.S. Application Data

(60) Provisional application No. 61/105,117, filed on Oct. 14, 2008, provisional application No. 61/105,077, filed on Oct. 14, 2008, provisional application No. 61/105,085, filed on Oct. 14, 2008, provisional application No. 61/105,059, filed on Oct. 14, 2008, provisional application No. 61/142,031, filed on Dec. 31, 2008, provisional application No. 61/142,010, filed on Dec. 31, 2008, provisional application No. 61/142,021, filed on Dec. 31, 2008.

(30) Foreign Application Priority Data

| Oct. 14, 2008 | (DE) | .................. 10 2008 051 533 |
| Oct. 14, 2008 | (DE) | .................. 10 2008 051 549 |
| Oct. 14, 2008 | (DE) | .................. 10 2008 051 553 |
| Oct. 14, 2008 | (DE) | .................. 10 2008 051 558 |
| Dec. 31, 2008 | (DE) | .................. 10 2008 063 408 |
| Dec. 31, 2008 | (DE) | .................. 10 2008 063 409 |
| Dec. 31, 2008 | (DE) | .................. 10 2008 063 410 |

(51) Int. Cl.
*H05B 1/02* (2006.01)
*H05B 3/36* (2006.01)
*B64D 15/12* (2006.01)

(52) U.S. Cl.
CPC .......... *H05B 3/36* (2013.01); *B64D 15/12* (2013.01); *H05B 2203/003* (2013.01); *H05B 2203/005* (2013.01); *H05B 2203/014* (2013.01); *H05B 2203/017* (2013.01); *H05B 2203/032* (2013.01)

(58) Field of Classification Search
CPC .............. H05B 2203/014; H05B 2203/017; H05B 2203/032; H05B 2203/005; H05B 2203/003; H05B 2203/004; H05B 1/0236; H05B 3/026; H05B 3/34; H05B 3/36
USPC .......... 219/483, 496, 484, 202, 508
See application file for complete search history.

(56) References Cited

U.S. PATENT DOCUMENTS

| 2,599,059 | A | * | 6/1952 | Jones .................. 244/134 D |
| 5,824,996 | A | | 10/1998 | Kochman et al. |
| 5,925,275 | A | | 7/1999 | Lawson et al. |
| 6,137,083 | A | | 10/2000 | Bost et al. |
| 6,150,642 | A | | 11/2000 | Weiss et al. |
| 6,238,411 | B1 | | 5/2001 | Thorner |
| 6,283,411 | B1 | | 9/2001 | Giamati et al. |
| 6,906,537 | B2 | * | 6/2005 | Goldberg et al. .......... 324/721 |
| 7,202,321 | B2 | | 4/2007 | Byrd et al. |
| 7,546,980 | B2 | * | 6/2009 | Giamati ................ 244/134 D |
| 7,913,952 | B2 | | 3/2011 | Boschet et al. |
| 8,481,888 | B2 | * | 7/2013 | Sandiford .................. 219/202 |
| 8,746,622 | B2 | * | 6/2014 | Gallman et al. .......... 244/134 D |

| | | | |
|---|---|---|---|
| 2005/0263646 | A1 | 12/2005 | Nichols |
| 2006/0006165 | A1 | 1/2006 | Yu et al. |
| 2006/0278631 | A1 | 12/2006 | Lee et al. |
| 2008/0135120 | A1 | 6/2008 | Seo |
| 2008/0197856 | A1 | 8/2008 | Schnaibel et al. |
| 2011/0290784 | A1 | 12/2011 | Orawetz et al. |
| 2013/0020312 | A1* | 1/2013 | Steinhauser et al. .......... 219/482 |

FOREIGN PATENT DOCUMENTS

| | | |
|---|---|---|
| CN | 101200219 | 6/2008 |
| DE | 21 63 703 | 6/1973 |
| DE | 20 66 008 B1 | 3/1979 |
| DE | 42 14 636 A1 | 10/1993 |
| DE | 198 31 574 A1 | 1/2000 |
| DE | 198 45 401 A1 | 4/2000 |
| DE | 101 51 298 A1 | 4/2003 |
| DE | 10 2004 031 625 A1 | 2/2006 |
| DE | 10 2004 042 423 A1 | 3/2006 |
| DE | 10 2008 051 533 | 4/2010 |
| DE | 10 2008 051 549 | 4/2010 |
| DE | 10 2008 051 553 | 4/2010 |
| DE | 10 2008 051 558 | 4/2010 |
| DE | 10 2008 063 408 | 7/2010 |
| DE | 10 2008 063 409 | 7/2010 |
| DE | 10 2008 063 410 | 7/2010 |
| EP | 0745919 A1 | 12/1996 |
| EP | 2340686 | 7/2011 |
| GB | 1321596 | 6/1973 |
| GB | 1385279 | 2/1975 |
| GB | 2437120 A | 10/2007 |
| WO | 2007/107732 A1 | 9/2007 |
| WO | WO 2010/049063 | 5/2010 |

OTHER PUBLICATIONS

PCT International Search Report, prepared by European Patent Office, Application No. PCT/EP2009/007381, Mailed Jul. 22, 2011.
PCT International Preliminary Report on Patentability, Application No. PCT/EP2009/007381, Issued Nov. 15, 2011.
German Office Action for Application No. 10 2008 063 409.3 dated May 19, 2014.
Chinese Office Action for Application No. 200980148144.9 dated May 4, 2014.

* cited by examiner

*Primary Examiner* — Mark Paschall
(74) *Attorney, Agent, or Firm* — Jenkins, Wilson, Taylor & Hunt, P.A.

(57) ABSTRACT

A heating system including an energy supply device, wherein the heating system includes a base heating device having an insulation layer, with an electrothermal base heating layer arranged thereon and with an electrical connecting device by way of which the energy supply device is connected to the base heating layer. The heating system includes an additional heating device having an insulation layer, with an electrothermal additional heating layer arranged thereon and with an electrical connecting device by way of which the energy supply device is connected to the additional heating layer. The energy supply device is connected to the heating layers by way of the connecting devices and in the activation phase, current is supplied during at least a partial period of time to the additional heating layer so that the base heating layer generates heat permanently, while the additional heating layer generates heat in the partial period of time.

10 Claims, 10 Drawing Sheets

HEATING SYSTEM HAVING AT LEAST ONE ELECTROTHERMAL HEATING LAYER, A STRUCTURAL COMPONENT HAVING SUCH A HEATING LAYER, A HEATING METHOD AND A METHOD FOR PRODUCING A SEMI-FINISHED COMPONENT OR A COMPONENT HAVING A HEATING DEVICE

RELATED APPLICATIONS

The present application is a national stage entry according to 35 U.S.C §371 of PCT application No.: PCT/EP2009/007381 filed on Oct. 14, 2009, which claims priority from German Application No.: 10 2008 051 558.2, filed on Oct. 14, 2008, German Application No.: 10 2008 051 533.7 filed on Oct. 14, 2008, German Application No.: 10 2008 051 549.3 filed on Oct. 14, 2008, German Application No.: 10 2008 051 553.1 filed on Oct. 14, 2008, German Application No.: 10 2008 063 410.7 filed on Dec. 31, 2008, German Application No.: 10 2008 063 409.3 filed on Dec. 31, 2008, German Application No.: 10 2008 063 408.5 filed on Dec. 31, 2008, U.S. Provisional Application No.: 61/105,117 filed on Oct. 14, 2008, U.S. Provisional Application No.: 61/105,059 filed on Oct. 14, 2008, U.S. Provisional Application No.: 61/105,085 filed on Oct. 14, 2008, U.S. Provisional Application No.: 61/105,077 filed on Oct. 14, 2008, U.S. Provisional Application No.: 61/142,031 filed on Dec. 31, 2008, U.S. Provisional Application No.: 61/142,010 filed on Dec. 31, 2008, and from U.S. Provisional Application No.: 61/142,021 filed on Dec. 31, 2008.

TECHNICAL FIELD

The invention relates to a heating system comprising at least one electrothermal heating layer, a structural component comprising such a heating layer and a method for the controlled heating of the heating system.

Furthermore, the invention relates to a method for producing a semi-finished component or a component comprising a heating device and a component comprising a heating layer. The semi-finished component is, in particular, provided for the production of components comprising fibre-reinforced material (FRM) or fibre-reinforced plastic (FRP) components for aviation components.

BACKGROUND

DE 198 31 574 A1 describes a seat heater comprising an electrical surface heating element made of woven carbon filaments, which surface heating element is used as a flexible resistance material to which along a border region of the surface heating element main electrodes for heating the surface heating element are connected. In order to achieve a shorter heating-up period the seat heater comprises an additional device with electrodes that extend over a partial region of the surface heating element.

DE 10 2004 042 423 A1 describes an aerodynamic component with surface heating for the prevention of ice formation on an exterior surface of the component.

Furthermore, from DE 10 2004 031 625 A1 a circuit arrangement for the diagnosis of heating resistance is known in order to determine a heating temperature.

EP 0 745 919 A1 describes a method for controlling the temperature of a heating element. During the measuring phase, heating is interrupted and the resistance of the heating element is compared to the setpoint setting. Depending on whether the resistance of the heating element is below the setpoint value, the control system for the alternating-voltage switch is informed as to whether or not heating needs to take place in order to reach the setpoint value.

WO2007/107732 A1 describes a system for the prevention of ice formation, which system is designed in such a manner that the heating devices used are kept at a constant temperature.

From U.S. Pat. No. 5,824,996 an electrically conductive textile heating element is known that comprises ribbons that are woven from non-metallic yarns. In this arrangement the ribbons are laid in their longitudinal direction onto a substrate component.

From US 2006/0278631 A1 the use of a woven material in ribbon form or nonwoven material structures is known for the production of an electrically conductive textile heating element, which woven material or nonwoven material structures are bonded onto a substrate in a previously prepared mould.

DE 101 51 298 A1 describes a heating foil on a substrate material in which resistance wires have been integrated along preferential directions.

Furthermore, from the general state of the art a method for the production of a heating body is known, in which method an electrically conductive carbon fibre layer is vapour-deposited onto a substrate material.

U.S. Pat. No. 6,137,083 describes a heating layer on an aerodynamic component for heating an elongated region of said aerodynamic component. The heating layer comprises a woven fabric in which bundles of electrically conductive rovings and insulation fibres that separate said rovings from each other are woven together with weft threads that extend transversally to the aforesaid and in the direction of the weft so as to support the woven fabric. The heating layer has been applied to a surface of the aerodynamic component in such a manner that the bundles of rovings extend parallel to each other along the front edge of the component. Such a woven material is associated with a disadvantage in the case of large-area implementations, in that in these cases, during the production process, the woven fabric overall needs to be stabilised with the use of binder material. The binder material has a negative effect on the material characteristics such as stiffness and strength or on the fatigue characteristics of the heating layer. These characteristics are, in particular, of great importance in applications relating to aircraft construction in order to form stable aerodynamic components with long service lives.

DE 42 14 636 A1 describes a multi-axial reinforcement structure comprising at least one sheet-like substrate layer and reinforcement threads, associated with this substrate layer, which at least in some regions extend along the lines of force corresponding to the tensions occurring in the moulded part.

SUMMARY

It is an object of the invention to provide a heating system by means of which a structural component can be heated in an efficient manner and at the same time with quickly achievable heating effects, which heating system can, in particular, be optimised for the respective application case in order to make possible effective heating of component surfaces. The heating system according to the invention is, in particular, to be able to heat a structural component of an aircraft in a manner that corresponds to the aircraft requirements. In this arrangement, according to one aspect of the invention it is to be possible for the heat-generating material of the heating system to be integrated in the structural component in particular in terms of weight. Furthermore, it is an object of the invention to provide a structural component and an arrangement comprising a structural component that comprise such a heating system.

It is a further object of the invention to provide a heating system comprising at least one electrothermal heating layer, a structural component and a method for the controlled heating of the heating system, by means of which heating system a structural component can be heated in an efficient manner and at the same time with quickly achievable heating effects, which heating system can, in particular, be optimised for the respective application case in order to make possible effective heating of component surfaces. The heating system according to the invention is, in particular, to be able to heat a structural component of an aircraft in a manner that corresponds to the aircraft requirements. Furthermore, it is an object of the invention to provide a structural component and an arrangement comprising a structural component that comprise such a heating system.

Moreover, it is a further object of the invention to provide a method for producing a semi-finished component and a method for producing a component comprising a heating device for heating a component surface, which methods can be optimised for the respective application case in order to make possible effective heating of component surfaces.

Furthermore, it is also an object of the invention to provide a heating layer that can be produced according to the method according to the invention.

According to the invention a fibre-reinforced heating layer comprising at least one bundle or one compound structure or one ribbon of rovings comprising electrically-conductive materials is used, which when connected to an electrical supply act as ohmic resistors, thus generating heat.

The above are associated with an advantage when compared to woven materials in that with these materials it is possible to produce structural components comprising better characteristics relating to strength and fatigue characteristics, and in that at the same time with these materials efficient heating, in energy terms, of the structural components is possible, of which structural components said materials form a part.

With the solution according to the invention the heating of structural components according to special individual-case requirements can take place in a particularly efficient manner. In particular, with the solution according to the invention a heating system is provided that from the point of view of energy efficiency is suitable for heating aircraft structural components. In particular, the heating system according to the invention can be used for the heating of exterior surfaces, which are subjected to airflow, of aircraft structural components in order to prevent and reduce ice formation on such exterior surfaces of structural components. In particular, as a result of the integration of the heating layer provided according to the invention it is possible to provide structural components that are particularly favourable in terms of weight and at the same time are also particularly heat-efficient. According to the invention, for forming the heating layer at least one bundle or one compound structure or one ribbon of rovings is provided, which is, in particular, integrated in a structural component in such a manner that the rovings can absorb stress in the structural component, which stress acts on the structural component as a result of external forces. In this manner, the heating layer integrated according to the invention in the structural component forms a load-transmitting part of the structural component.

Furthermore, heating currents that change over time and that have high peaks during some phases are possible in the heating layer, because the temperatures that occur locally in the heating layer according to the invention can be controlled and in particular regulated. The combination of the ability to optimise the roving structure on the semi-finished substrate component or on the heating layer, together with the ability to control or regulate the temperatures that occur in the heating layer, makes possible a particularly effective use in certain application cases in which by means of structures and materials that are built as simply as possible and in a lightweight manner, temporarily high heating outputs are necessary. Accordingly a preferred application case relates to components of aircraft, in particular of surfaces of aerodynamic bodies that are subjected to airflow. The solution according to the invention makes possible a safe and permanent integration of a heating layer in a component and in particular in a shell component of an aerodynamic body of an aircraft. Furthermore, the effects which heating the heating layer produced according to the invention has on the component on which the heating layer is arranged can be controlled in a very simple manner.

According to the invention a heating system comprising at least one energy supply device is provided. The heating system comprises in particular:

a base heating device comprising an insulation layer with an electrothermal base heating layer arranged thereon which comprises at least one bundle or one compound structure or one ribbon of rovings, and with an electrical connecting device by way of which the at least one energy supply device is connected to the base heating layer, an additional heating device comprising an insulation layer with an electrothermal additional heating layer arranged thereon and with an electrical connecting device by way of which the energy supply device is connected to the additional heating layer.

In this arrangement it is, in particular, provided for the ends of each roving in each case to be connected to an electrode of the electrical connecting device so that each roving extends between the two electrodes of the electrical connecting device. Furthermore, if a plurality of rovings are provided, said rovings extend along each other and continuously between the connecting devices.

In particular, a structural component comprising a device for heating a surface of the structural component is provided, wherein the device for heating a surface of the structural component comprises the above-mentioned heating system and comprises in particular:

an arrangement comprising an insulation layer, with an electrothermal base heating layer arranged on a substrate layer or on the surface of the structural component, which electrothermal base heating layer comprises at least one bundle or one compound structure or one ribbon of rovings, and with an electrical connecting device for connecting an energy supply device to the base heating layer, wherein the ends of each roving are in each case connected to an electrode of the electrical connecting device, an additional heating device comprising an insulation layer arranged on the substrate layer or the surface of the structural component, with an electrothermal additional heating layer (11) arranged thereon, which additional heating layer (11) comprises at least one bundle or one compound structure or one ribbon of rovings, and with an electrical connecting device (A11-1, A11-2) for connecting an energy supply device (E10, E11, E12) to the additional heating layer.

The ends of each roving are in each case connected to an electrode of the electrical connecting device so that each roving extends between the two electrodes of the electrical connecting device. Furthermore, if a plurality of rovings are provided, said rovings extend along each other.

By means of such a heating layer very efficient heating, in energy terms, of the structural component is possible.

In this arrangement, for the purpose of producing a functionally cohesive heating effect, the base heating device and the additional heating device are spatially associated with each other, and in this arrangement the energy supply device is designed in such a manner that in the activation phase current is supplied during at least a partial period of time to the additional heating layer in order to heat the structural component in the region of the additional heating layer to a supposed setpoint temperature, and that, above and beyond the activation phase, current is permanently supplied to the base heating layer so that the base heating layer generates heat permanently, while the additional heating layer generates heat in the partial period of time. The activation phase extends over a period of time in respect of whose end it is assumed that the structural component in the region of the additional heating layer has assumed a setpoint temperature.

In this arrangement the energy supply device can, in particular, be designed in such a manner that in first periods of time in the heating phase current flows in the additional heating layer at an intensity 50% higher than that of the current flowing through the base heating layer, and that in second periods of time in the heating phase, which periods of time follow a respective first period of time, current flows in the additional heating layer at an intensity 50% lower than that of the current flowing through the base heating layer.

As an alternative or in addition, the heating system can comprise: a further additional heating device comprising an insulation layer with a further electrothermal additional heating layer arranged thereon, and comprising an electrical connecting device by way of which the energy supply device is connected to the further additional heating layer,
  wherein the function of the energy supply device for controlling the current in the heating layers is designed in such a manner that, in relation to the current which in each case flows in the additional heating layers, in each additional heating layer first and second periods of time with different current intensities of the heating current form, which periods of time alternate,
  wherein the current intensities in the respective first heating phases are significantly higher than the current intensities in the respective second heating phases.

In this arrangement the first electrothermal additional heating layer and the further electrothermal additional heating layer in relation to the sheet-like extension of the base heating layer can be arranged within said base heating layer.

According to a further exemplary embodiment according to the invention, the at least one base heating layer and/or the at least one electrothermal additional heating layer can comprise at least one ribbon of electrically conductive rovings which are connected by way of the electrical connecting devices to the energy supply device, which rovings can, in particular, comprise carbon conductors, wherein the at least one ribbon of rovings is arranged in such a manner that it is distributed in a sheet-like manner over the additional heating layers. In other words, the rovings can generally-speaking comprise an electrically conductive material. In a special exemplary embodiment the rovings can comprise carbon conductors. In this manner the respective heating layer can be integrated in a particular manner, in terms of structure or material, with the respectively associated insulation layer and/or the component on which the respective heating layer is arranged. For example, it can be provided for these layers to then be produced in an integrated production process and/or in this process, in particular, to be made in a single piece. In the embodiments of the invention it can be provided, as an alternative or in addition, for the electrothermal base heating layer to comprise at least one ribbon of rovings comprising carbon conductors, which ribbon is connected to the energy supply device by way of the electrical connecting devices, wherein the at least one ribbon of rovings is arranged in such a manner that it is distributed in a layer in a sheet-like manner over the base heating layer. In all these cases the roving can comprise carbon filaments that extend in the rovings parallel to each other and at least in some sections in longitudinal direction of the rovings.

In the heating system according to the invention it can further be provided for the at least one electrothermal additional heating layer to comprise at least one ribbon of rovings, connected to the energy supply device by way of the electrical connecting devices, which ribbon of rovings extends in a meandering manner within the respective heating layer.

The heating region of the first and/or of the second internal heating device can, when viewed in the direction of thickness of the respective heating region, comprise at least one ribbon of rovings.

Generally speaking, the heating layers can comprise rovings and in this arrangement one layer or several layers of rovings.

As an alternative or in addition, the electrothermal layer can comprise metallic conductors.

In this arrangement the insulation layers can be designed so as to be in one piece or in several pieces.

According to the invention, furthermore, an arrangement comprising a structural component and a heating system for heating a surface of the structural component is provided, wherein the structural component is designed according to one of the embodiments described in this document. The structural component of the arrangement comprising a structural component and a heating system can, in particular, comprise a shell component. In this arrangement the surface on which the heating layers are arranged can form part of the shell component.

According to the invention the shell component can be an exterior shell of a slat, and the base heating layer can be arranged on the inside and/or on the outside of the exterior shell. The at least one additional heating layer can be arranged on the inside and/or on the outside of the exterior shell.

The invention can be used in metallic and non-metallic designs, i.e. in conjunction with metallic and non-metallic structural components.

Preferably an individual layer of rovings is arranged on the insulating layer or on the component. This makes it possible to efficiently heat the component.

In particular in the case of current intensities that are time-dependent within the respective, e.g. first and second, heating phases, the current intensities can be medium current intensities.

According to a further aspect of the invention, a heating system comprising at least one electrothermal heating layer is provided. The heating system further comprises:
  an energy supply device comprising a load-voltage supply device for applying a load voltage for heating the heating layer, wherein the load-voltage supply device is connected to the heating layer by means of an electrical connecting device, and comprising a measuring-voltage supply device for providing a measuring voltage that is lower than the voltage for heating the heating layer, wherein the measuring-voltage supply device is connected to the heating layer by means of an electrical connecting device, a control device coupled to the load-voltage supply device and to the measuring-voltage supply device, which control device controls the aforesaid to provide the load voltage and the measuring voltage, and comprises a control function by means of which the load voltage is reduced to zero and subsequently the measuring voltage is applied, and by means of which in a time alternating manner the load voltage for heating the heating layer and the measuring voltage for measuring the resistance of the heating layer are applied, an evaluation device for determining the electrical resistance of the heating layer based on the measured current intensity, wherein the electrothermal heating layer comprises at least one bundle, in each case connected to the energy supply device by way of the electrical connecting devices, or a compound structure or a ribbon of rovings comprising carbon conductors, wherein the at least one ribbon of rovings is arranged in such a manner that it is distributed in a sheet-like manner over the heating layers, and wherein in each case the ends of each roving are connected to an electrode of the electrical connecting device.

The heating layer can, in particular, form an integral part of a described structural component according to the invention, and consequently said heating layer forms a load-bearing part of the structural component.

The heating system can, furthermore, be implemented according to an embodiment according to the invention.

In an exemplary embodiment of the invention, the evaluation device comprises a function by means of which on the basis of the resistance of the heating layer the determination of the temperature of the heating layer is carried out. As an alternative or in addition, the evaluation device can comprise a function by means of which on the basis of the resistance of the heating layer the integrity of the heating layer and/or of the component is determined.

In the heating system according to the invention it can, in particular, be provided for the energy supply device to comprise a measuring-voltage supply device for providing a measuring voltage that is lower than the voltage for heating the heating layer, wherein the measuring-voltage supply device is connected to the heating layer by means of an electrical connecting device. In this arrangement the heating system can further comprise: a control device, coupled to the load-voltage supply device and to the measuring-voltage supply device, which control device controls the aforesaid in order to provide the load voltage and the measuring voltage, and comprises a control function by means of which the load voltage is set to a negligible value or to zero, and subsequently the measuring voltage is applied. The measuring voltage can, in particular, be below 5 volts.

In this arrangement the measuring device can be provided for measuring an electrical resistance caused by the measuring voltage, or for determining the integrity of the heating layer and/or of the component.

The control device can, in particular, be designed in such a manner that in a time alternating manner the load voltage for heating the heating layer, and the measuring voltage for measuring the resistance of the heating layer are applied. This alternating application of the load voltage and application of the measuring voltage can also take place at a time-constant frequency.

In this arrangement it can further be provided that in a time alternating manner a load voltage for heating the heating layer is generated by the first energy supply component, and a measuring voltage for measuring the resistance of the heating layer is generated by the second energy supply component.

According to a further aspect of the invention, the heating system according to the invention can be designed in such a manner
that in the at least one electrothermal heating layer there is an electrical measuring line that is integrated in the heating layer, that the energy supply device comprises a measuring-voltage supply device for applying a measuring voltage which by way of measuring line connections is connected to the electrical conductor, that the measuring device is provided for measuring a current intensity in the measuring line, which current intensity has been caused by the measuring voltage.

In this arrangement the heating system can, in particular, comprise: an energy supply device comprising a load-voltage supply device for applying a load voltage for heating the heating layer, wherein the load-voltage supply device is connected to the heating layer by means of an electrical connecting device.

In this arrangement the electrothermal heating layer comprises at least one bundle or compound structure or ribbon of rovings comprising carbon conductors, which bundle or compound structure or ribbon of rovings is connected to the energy supply device by way of the electrical connecting devices, wherein in each case the ends of each roving are connected to an electrode of the electrical connecting device, so that each roving extends between the two electrodes of the electrical connecting device, and wherein in each case the at least one ribbon of rovings is arranged in such a manner that it is distributed in a sheet-like manner over the additional heating layers. Furthermore, in the at least one electrothermal heating layer there is an electrical measuring line that is integrated in the heating layer. Furthermore, the design is such:

that the energy supply device comprises a measuring-voltage supply device for the application of a measuring voltage that is connected to the electrical measuring line by way of the measuring line connections, that the measuring device is provided for measuring a current intensity in the measuring line, which current intensity has been caused by the measuring voltage, that the measuring device is functionally connected to a sensor-value processing device which comprises a comparison function that compares temperature values to at least one comparison value that corresponds to the probability of ice formation on the shell component, and that transmits a signal value to a system function when the limiting value is reached or exceeded.

The measuring line can comprise a bundle or a compound structure or a ribbon of rovings.

According to an exemplary embodiment, the heating layer can form part of one of the above-mentioned structural components and can have been produced according to the invention as part of such a structural component.

In this arrangement it can, in particular, be provided for the measuring voltage to be less than $\frac{1}{10}$th of the voltage for heating the heating layer. Consequently it is possible in relation to the measuring-voltage supply device and the measuring device to use components suitable for low tensions and current intensities, and in particular to use smaller components.

In these exemplary embodiments the heating system can be designed in such a manner that the measuring device is functionally connected to a sensor-value processing device which comprises a comparison function that compares temperature values to at least one comparison value that corresponds to the probability of ice formation on the shell component, and that transmits a signal value to a system function when the limiting value is reached or exceeded.

In particular, the system function can be designed in such a manner that it stops heating the heating layer when the limiting value that corresponds to the probability of ice formation on the shell compartment is exceeded.

According to a further aspect of the invention, the heating device can be designed in such a manner that it can generate various heating levels with various thermal outputs, and the system function can be designed in such a manner that the warning signal is generated when at least one predetermined heating level is operative at which the maximum thermal output is generated while at the same time a limiting value that corresponds to the probability of ice formation on the shell component is exceeded. The warning signal can, in particular, be generated when the highest heating level is operative.

According to a further exemplary embodiment of the invention, a regulating function for regulating the temperature of the shell component can be provided, which regulating function is functionally connected to the sensor-value processing device and from the aforesaid receives the determined temperature values as an input variable, wherein on the basis of a setpoint temperature the regulating function generates command signals to the energy supply device.

According to the invention, furthermore, a structural component, in particular of an aircraft, comprising a shell component is provided, which shell component comprises an exterior surface that is subjected to airflow, and an interior region, wherein the structural component furthermore comprises a heating layer of a heating system according to an exemplary embodiment of the invention. Furthermore, an energy supply device, a measuring device and an evaluation device are associated with, or integrated in, the structural component or the heating layer.

According to a further aspect of the invention, a method for the controlled heating of a heating system comprising at least one electrothermal heating layer is provided, involving the following steps:
  in a heating phase, applying a load voltage to the heating layer for heating the heating layer,
  during or outside the heating phase, applying a measuring voltage to the heating layer, which measuring voltage is lower than the load voltage,
  measuring a current-intensity change which occurs as a result of the temperature dependence of the electrical resistance of the carbon-fibre heating element with the measuring voltage applied.

The heating system is, in particular, designed according to an exemplary embodiment according to the invention. In this method, determining the temperature of the heating layer can take place on the basis of the change in the current intensity due to the temperature dependence of the electrical resistance of the carbon-fibre heating layer. As an alternative or in addition, it can be provided for determination of the integrity of the heating layer and/or of the component to take place on the basis of the resistance of the heating layer.

A further aspect of the invention provides for: a method for monitoring the integrity of a heating layer that comprises one of at least one bundle or a compound structure or a ribbon of rovings, wherein in the at least one electrothermal heating layer there is an electrical measuring line that is integrated in the heating layer, characterised by the steps of:
  applying a load voltage; after a predetermined period of time after applying the load voltage, measuring a load current in the heating layer as a value for a temperature to be attained,
  subsequently measuring a measuring current in the measuring line on the basis of a predetermined measuring voltage, applied to said measuring line, as a value relating to an actual temperature,
  comparing the value relating to the temperature to be attained with the value relating to the actual temperature, and, if there is a difference in the values relating to the temperatures by a minimum amount, allocating an error condition to the heating layer.

In this method it can, in particular, be provided for at least one bundle or one compound structure or one ribbon of rovings to be used as a measuring line. In particular a separate measuring line that is situated between rovings can be used as a measuring line.

The method can be designed in such a manner that a first minimum amount and a second minimum amount are predetermined for determining the difference of the values relating to temperatures, wherein the first minimum amount is lower than the second minimum amount, and that a first error condition is allocated to the heating layer when the difference of the values relating to temperatures is between the first and the second minimum value, and that a second error condition is allocated to the heating layer if the difference of the values relating to temperatures is above the second minimum amount. In this arrangement, in particular on the basis of the allocation of the second error condition the heating layer can be considered to be defective, and the respective function for applying the load voltage can be configured in such a manner that as a result of this allocation said heating layer is not operated.

According to the invention, furthermore, a heating system comprising a structural component with at least one electrothermal heating layer as an integral component of the aforesaid is provided, comprising:
  an energy supply device comprising a load-voltage supply device for applying a load voltage for heating the heating layer, wherein the load-voltage supply device is connected to the heating layer by means of an electrical connecting device,
  wherein in the at least one electrothermal heating layer there is an electrical measuring line in which the heating layer is integrated,
  wherein the electrothermal heating layer comprises at least one ribbon of rovings comprising carbon conductors, which ribbon is connected to the energy supply device by way of the electrical connecting devices, wherein in each case the ends of each roving are connected to an electrode of the electrical connecting device so that each roving extends between the two electrodes of the electrical connecting device, and wherein in each case the at least one ribbon of rovings is arranged in such a manner that it is distributed in a sheet-like manner over the additional heating layers,
  wherein the energy supply device comprises a load-voltage supply device for producing a measuring voltage that is connected to the electrical measuring line by way of measuring line connections,
  wherein the measuring device is provided for measuring a current intensity in the measuring line, which current intensity is caused by the measuring voltage,
  wherein the measuring device is functionally connected to a checking device which for checking the integrity of the heating layer applies a load voltage; after a predetermined period of time following the application of the load voltage, measures a load current in the heating layer as a value for a temperature to be attained; subsequently measures a measuring current in the measuring line on the basis of a predetermined measuring voltage, applied to said measuring line, as a value relating to an actual temperature; subsequently compares the value relating to the temperature to be attained with the value relating to the actual temperature, and if there is a difference in the values relating to the temperatures by a minimum amount, allocates an error condition to the heating layer.

According to a further aspect of the invention, a method for producing a semi-finished component for use in the production of a three-dimensional component on whose surface at least one heating layer is arranged is provided, with the method comprising the steps of:

in a roving definition step, starting from an area-specific heating output, which is to be achieved by each heating layer provided, at a predetermined heating voltage, determining the geometric arrangement and/or the course of at least one bundle or one compound structure or one ribbon of rovings for forming a heating layer featuring minimal energy consumption, according to the arrangement and the course of the at least one bundle or ribbon of rovings, after the roving definition step, step-by-step application of electrically-conductive rovings side by side on a semi-finished substrate component, fixed in a flat manner, which semi-finished substrate component comprises an electrically insulating material, and fastening of the rovings to the semi-finished substrate component, carrying out a stabilisation process for stabilising the semi-finished product with the rovings or with the at least one bundle or the at least one compound structure or the at least one ribbon of rovings.

In this arrangement, determining the geometric arrangement and/or the course of the at least one bundle or one compound structure or one ribbon of rovings to form a heating layer can take place starting from a predetermined geometric boundary course of the heating layer.

Furthermore, it can be provided that the determination of the geometric arrangement and/or of the course of the at least one bundle or one compound structure or one ribbon of rovings to form a heating layer is selected from a predetermined group of arrangements and/or courses of the rovings within the predetermined geometric boundary course. In this arrangement it can be provided for a serpentine course and/or a circular course of the rovings in the heating layer to form part of the predetermined group of courses of the rovings.

Moreover, in this method the geometric arrangement and/or the course of the at least one bundle or one compound structure or one ribbon of rovings to form a heating layer can be predetermined, and starting from this predetermination the number of rovings and/or size of the rovings and/or the distance between rovings can be determined.

Fastening the rovings to the semi-finished substrate component can, in particular, take place by means of a sewing or embroidery method or a bonding method on the semi-finished substrate component.

The stabilisation process can, in particular, comprise a binder process. In this arrangement it can, in particular, be provided for the rovings to be fastened to the semi-finished substrate component by means of a sewing or embroidery method.

Fastening the rovings can, in particular, take place by means of a sewing or embroidery method on the semi-finished substrate component and in this arrangement, in particular, individually or in groups. In other words it can be provided for each roving to be fastened individually to the semi-finished substrate component by means of an embroidery method, and/or for several rovings together to be fastened to the semi-finished substrate component by means of an embroidery method. In the case of fastening the rovings in groups it is, in particular, provided for groups of up to three rovings to be fastened together, and subsequently for one or several rovings to be laid and fastened. In the case of individual fastening of the rovings to the semi-finished substrate component it can additionally be provided for groups of rovings to be fastened to the semi-finished substrate component by means of an embroidery method.

As an alternative or in addition, it can be provided for the rovings to be fastened to the semi-finished substrate component by means of a bonding method.

The rovings to be applied to the semi-finished substrate component can comprise dry material and/or prepreg material. To carry out a bonding method for fastening the rovings to the semi-finished substrate component it is possible to use resin of prepreg rovings, provided that prepreg material is used for the rovings.

The production method according to the invention with fastening of the rovings by means of an embroidery method to the semi-finished substrate component makes it possible, in particular, for the rovings to be distributed over the area of the semi-finished substrate component in such a manner that each roving extends on the same laying plane when viewed in the thickness direction of the semi-finished substrate component or the heating layer to be formed. In other words in this arrangement no overlaying of individual rovings or overlaying of sections of the same roving in the above-mentioned thickness direction is permitted. Fastening the rovings to the substrate component can take place step-by-step with each individual roving so that after embroidering a roving in place on the substrate component the next roving is laid onto the substrate component.

This method can be elaborate in an individual application case; however, the arrangement of rovings on the semi-finished substrate component, which arrangement results from this method, is associated with an advantage in that, for example, the arrangement, the course, the thickness, the quality and/or the number of rovings can be optimised according to predeterminable optimising criteria. Furthermore, heating currents that change over time and that in some phases have high peaks in the heating layer are possible, because the temperatures that occur locally in the heating layer according to the invention can be controlled and, in particular, can be regulated. The combination of the ability to optimise the roving structure on the semi-finished substrate component or on the heating layer, together with the ability to control or regulate the temperatures that occur in the heating layer, makes possible a particularly effective use in certain application cases in which, by means of structures and materials that are built as simply as possible and in a lightweight manner, temporarily high heating outputs are necessary. Accordingly a preferred application case relates to components of aircraft, in particular of surfaces and of aerodynamic bodies that are subjected to airflow. The solution according to the invention makes possible the safe permanent integration of a heating layer in a component and in particular in a shell component of an aerodynamic body of an aircraft. Furthermore, the effects which heating the heating layer produced according to the invention has on the component on which the heating layer is arranged can be controlled in a very simple manner.

According to an exemplary embodiment of the method according to the invention it can, furthermore, be provided for the laying and fastening of the rovings to the semi-finished substrate component to take place in such a manner that the rovings form a ribbon comprising a layer of rovings in place side by side. In this arrangement the rovings can be laid in such a manner that they extend parallel to each other and in some sections along a serpentine course.

According to a further exemplary embodiment of the method according to the invention, it can be provided that after the rovings have been fastened to the substrate component, said substrate component with the rovings fastened to it is placed on a tool with a three-dimensional supporting-surface contour.

In a further implementation of the method according to the invention, in the heating layer definition step, starting from a definition of at least one heating layer on the component to be produced, the area-specific heating output to be achieved with each provided heating layer at a predetermined voltage is determined.

As an alternative or in addition, with the method according to the invention, it can be provided that after the heating-layer definition step, in a roving definition step for an area-specific heating output the number of rovings for the respective heating layer is minimised.

According to the invention, it can be provided that after the heating-layer definition step, in a roving definition step for an area-specific heating output the number of bundles or ribbons of rovings for the respective heating layer is minimised.

According to the method according to the invention, it can also be provided that prior to laying the semi-finished substrate component on a tool comprising a three-dimensional supporting-surface contour, contacting of end sections of the rovings or of the at least one bundle or ribbon of rovings takes place by connecting a metallic contact body to the end sections of the rovings or of the at least one bundle or ribbon of rovings by means of electrically conductive adhesive. The adhesive can, in particular, be an adhesive that comprises metal.

In the method according to the invention, the rovings or the bundles of rovings or the at least one ribbon of rovings can comprise electrically conductive metallic and non-metallic fibres.

According to a further exemplary embodiment of the method according to the invention, it can be provided for rovings made of glass to be laid between electrically conductive rovings of the at least one bundle or compound structure or ribbon of rovings in order to electrically insulate electrically conductive rovings from each other.

According to a further exemplary embodiment of the method according to the invention, it can be provided for a woven glass fabric to be laid between electrically conductive rovings or the at least one bundle or compound structure or ribbon of rovings in order to electrically insulate two layers of rovings from each other.

According to the invention, furthermore, a method for producing a component with an arrangement of at least one heating layer is provided, in which method the production of a semi-finished component according to an exemplary embodiment of the method for producing a semi-finished component for use in the production of a three-dimensional component takes place. In this arrangement it is provided for the semi-finished component to be produced by means of a resin infusion method or resin injection method. As an alternative or in addition, prepreg semi-finished products can be used for producing the semi-finished component so that the semi-finished component is produced in a prepreg production method. In this arrangement, prepreg material can be used, in particular for the semi-finished substrate component and/or the material for the insulation layer and/or the material for the rovings.

In this arrangement it can be further provided for the cured component to be reworked in a machining process. As an alternative or in addition, it can be provided for connection of an energy supply device and a functional check of the heating layer arrangement to be carried out by means of a thermography method.

According to the invention, furthermore, a component comprising at least one electrothermal heating layer is provided, wherein the at least one electrothermal additional heating layer comprises: a plurality of rovings comprising electrical conductors, wherein the plurality of rovings are arranged in such a manner that the plurality of rovings are distributed in a sheet-like manner over the heating layer, and electrical connecting devices for connecting the heating layer to an energy supply device. In this arrangement the plurality of rovings can, in particular, form at least one ribbon of rovings, wherein the at least one ribbon of rovings is arranged in such a manner that it is distributed in a sheet-like manner over the heating layer. The electrical conductors of the rovings can be carbon conductors or can comprise carbon conductors, wherein the at least one ribbon of rovings is arranged in such a manner that said ribbon is distributed in a sheet-like manner over the heating layer. In particular, the at least one roving can comprise carbon filaments that extend in the rovings parallel to each other and at least in some sections in longitudinal direction of the rovings.

The rovings can extend in a meandering manner within the at least one electrothermal heating layer.

Furthermore, when viewed in its direction of thickness, the electrothermal heating layer can comprise a layer of at least one ribbon of rovings.

As an alternative or in addition, the electrothermal heating layer can comprise metallic conductors.

According to a further aspect of the invention, a pyrometer is used for measuring the temperature at a region of the structural component. In this arrangement, in particular, a structural component of an aircraft is provided with a temperature measuring device for determining the temperature of a region of the structural component, wherein the structural component comprises a shell component with an exterior surface that is subjected to airflow and an inner region and a substrate component. The temperature measuring device comprises, in particular:

a pyrometer arranged on a substrate component of the structural component, which pyrometer which is directed towards a region at the surface of the shell component, which surface faces the pyrometer, with said pyrometer comprising a radiation sensor for generating sensor values on the basis of the thermal radiation, a sensor-value processing device which determines temperature values from the sensor values acquired by the radiation sensor.

In this arrangement the sensor-value processing device can comprise a comparison function that compares temperature values to at least one comparison value that corresponds to the probability of ice formation on the shell component, and that transmits a signal value to a system function when the limiting value is reached or exceeded.

According to a further exemplary embodiment of the invention, on the shell component a heating device is arranged for preventing ice formation on the shell component, and the system function is designed in such a manner that it switches the heating device on when the limiting value that corresponds to the probability of ice formation on the shell component is exceeded. In this arrangement the heating device can be designed in such a manner that it can generate various heating levels, and the system function is designed in such a manner that the warning signal is generated when the highest heating level is operative at which the maximum thermal output is generated while at the same time a limiting value that corresponds to the probability of ice formation on the shell component is exceeded.

The combination according to the invention, comprising a structural component and a temperature measuring device, can be designed in such a manner that on a surface of the shell component at least one heating layer is arranged which can be heated by means of an energy supply device in order to prevent ice formation.

A regulating function for regulating the temperature of the region of the shell component, which region is covered by the pyrometer, can be associated with the temperature measuring device which is functionally connected to the sensor-value processing device and from the latter receives the temperature values as an input variable, which temperature values were determined from sensor values of the pyrometer, wherein on the basis of a setpoint temperature of the region of the shell component, which region is acquired by the pyrometer, the regulating function generates command signals to the energy supply device.

According to the invention the pyrometer can be attached to the substrate component in such a manner that the orientation and/or the position of the pyrometer are/is adjustable.

Advantages with the use of a pyrometer result in particular in that measuring can take place in a very short time, typically in a period of time between 1 ms and 10 μs.

Consequently evaluation in an evaluation device, and in particular regulating the temperature with a de-icing device can take place within a short period of time and even within the same rate of iteration. The error rate of the measuring device with the pyrometer does not experience wear and tear so that it features a reduced error rate. Moreover, the use according to the invention of a pyrometer is associated with adequate measuring precision because with the pyrometer no influencing of the temperature of the measuring object occurs, and no errors result due to inadequate thermal contact between a sensor and the component on which measuring is to take place. In particular, measuring with the pyrometer can also take place if electromagnetic fields occur on a surface of the component.

For direct acquisition of temperatures on regions of components, and in particular of shell components, thermoelements that are integrated in the component or in the shell component could be used. On the other hand the use of a pyrometer for acquiring the temperature on de-icing structures for aviation components is associated with an advantage in that said pyrometer can be installed as an additional component in an optimised component structure without there being a need to modify the shell component of the respective component. However, the use of thermoelements integrated in the component or in the shell component necessitates more expensive production of the component structure. Furthermore, integration of a conventional thermoelement would result in thickened parts of the shell component which would be unfavourable on aviation components subjected to the flow of air. Moreover the connection technology by means of which a thermoelement is to be integrated in a shell component is problematic as a result of an unsafe service life of the connection on aircraft components. Furthermore, thermal coupling to the heating structure is complicated and expensive and is possible only with certain technical constraints with consequences in the acquisition of temperatures. The thermoelement would be too slow to be in a position to enable and acquire a high rate of heating during activation of a de-icing device on an aircraft component.

When installing a pyrometer in a structural component of an aircraft, by means of a suitable distance and optics an area can be defined in which the pyrometer can "integrally" acquire the temperature. By means of a thermoelement integrated in a shell component the temperature can only be acquired locally on a very small area on the heating element.

Replacing the pyrometer in the case of damage poses no problems and is advantageous above all when compared to the use of a thermoelement that is integrated in a shell component, because in the case of a defect the pyrometer is exchangeable. In contrast to this, in the case of a thermoelement integrated in the heating structure the entire shell component would have to be renewed.

BRIEF DESCRIPTION OF THE DRAWINGS

Below, exemplary embodiments of the invention are described with reference to the enclosed figures which show the following.

DESCRIPTION

Figure 1:
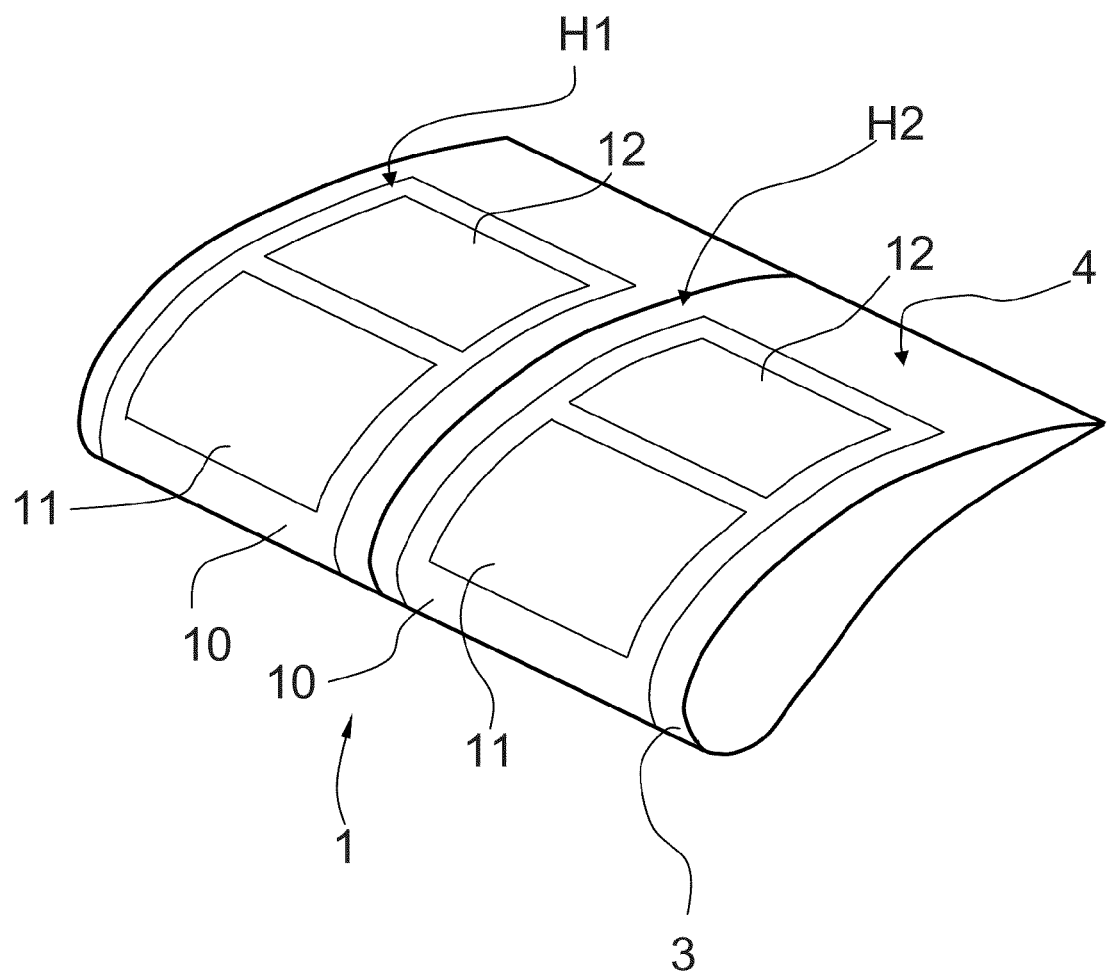
FIG. 1 a perspective view of a leading-edge flap comprising two heating layers of a heating system according to the invention, FIG. 2 a diagrammatic view of an exemplary embodiment of a heating system according to the invention with a heating layer comprising carbon rovings with an energy supply device that can be used for monitoring the heating layer, FIG. 3 a diagrammatic view of an exemplary embodiment of a heating system according to the invention with three heating layers comprising carbon rovings with an energy supply device that can be used for monitoring the heating layer, FIG. 4 a diagrammatic view of an exemplary embodiment of a heating system according to the invention with a heating layer comprising carbon rovings with an energy supply device that can be used for monitoring the heating layer, wherein an electrical conductor whose resistance is used to determine the state of the heating layer is integrated in the heating layer, FIG. 5 a diagrammatic view of an exemplary embodiment of a heating system according to the invention with three heating layers comprising carbon rovings with an energy supply device that comprises a load-voltage supply device and measuring-voltage supply devices for monitoring the heating layers, wherein an electrical conductor whose resistance is used to determine the state of the heating layer is integrated in the heating layers, FIG. 6 an exemplary embodiment of an arrangement of rovings to form a heating layer for the heating system according to the invention, FIG. 7 a further exemplary embodiment of an arrangement of rovings to form a heating layer for the heating system according to the invention, FIG. 8 a further exemplary embodiment of an arrangement of rovings to form a heating layer for the heating system according to the invention, FIG. 9 a flowchart with method-related steps according to the invention, wherein some of the method-related steps shown are to be considered to be optional, FIG. 10 a diagrammatic section view of an exemplary embodiment of the invention with a leading-edge flap of an aircraft, which leading-edge flap comprises a shell component and an internal region in which a pyrometer for acquiring the temperature of the shell component is arranged, FIG. 11 a section of a leading-edge flap of an aircraft, into which section two additional heating bodies are integrated.

According to the invention a heating system comprising at least one electrothermal heating layer is provided, which heating layer comprises in particular carbon fibres and is arranged on a component 1. The heating system further comprises:

- an energy supply device comprising a load-voltage supply device for applying a load voltage for heating the heating layer, wherein the load-voltage supply device is connected to the heating layer by means of an electrical connecting device,
- a measuring device for measuring a current intensity when the load voltage is applied, and
- an evaluation device for determining the electrical resistance of the heating layer on the basis of the measured current intensity.

In particular, it can be provided for the temperature to be determined on the basis of the determination of the electrical resistance which occurs at this resistance.

With the use of an electrothermal heating layer, by measuring the current intensity in the heating layer or in an electrical feed line to the heating layer, according to the invention the electrical resistance is determined by means of the voltage applied to the heating layer in the same period of time and by means of Ohm's law. The heating system 1 according to the invention comprises at least one electrothermal heating layer that is provided for arrangement on a structural component. By arranging the heating layer on the structural component the latter can be heated in order to heat the ambient air or the component itself. To measure the current intensity a measuring device is provided, and to determine the electrical resistance an evaluation device is provided that is functionally connected to the measuring device. To determine the electrical resistance, the evaluation device can comprise calibration tables that take into account the special characteristics of the respective component 1, which characteristics lead, for example, to non-linearity effects.

Depending on the application case, the determined current intensity is used for various purposes. From the determined current intensity it is possible to determine the respective temperature that in each case is present in the heating layer and thus on the component 1. For this purpose the effect is utilised according to which the electrical resistance of the carbon-fibre heating layer changes as the temperature changes. In an exemplary embodiment of the invention, the evaluation device comprises a function by means of which on the basis of the resistance of the heating layer determining the temperature of the heating layer is determined. For this purpose a correlation table or a correlation function can be implemented in the evaluation device, by means of which table or function the evaluation device, from the current intensity determined, determines the temperature relating to the respective component. As an alternative or in addition, the evaluation device can comprise a function by means of which on the basis of the resistance of the heating layer the integrity of the heating layer is determined, since when the current intensity drops below a predetermined limiting value it can be assumed that the electrothermal layer has a defect in the electrically conductive region, and thus as part of the component is also damaged. For this purpose the evaluation device can comprise a comparison function that compares a determined current intensity, or the respectively determined current intensity, to a predetermined limiting value for a difference between the respectively determined current intensity and a setpoint current-intensity value stored with a respectively applied voltage. Furthermore, the evaluation device can comprise a function which, when this limiting value is exceeded, allocates the status "defective" to the respective heating layer. Furthermore, this function can be designed in such a manner that it generates a warning signal and issues it to some other function for using this warning signal.

Figure 2:
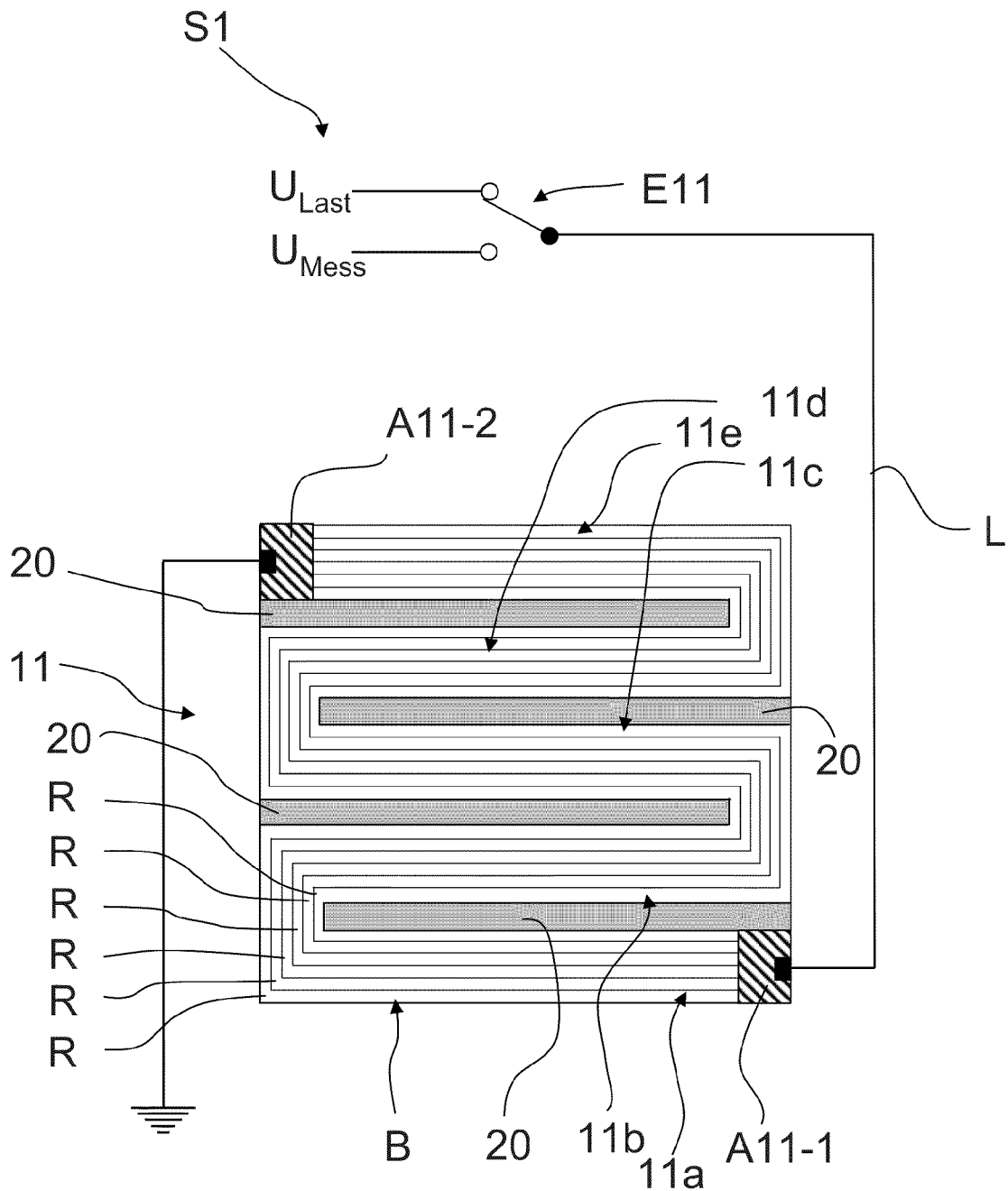
Figure 3:
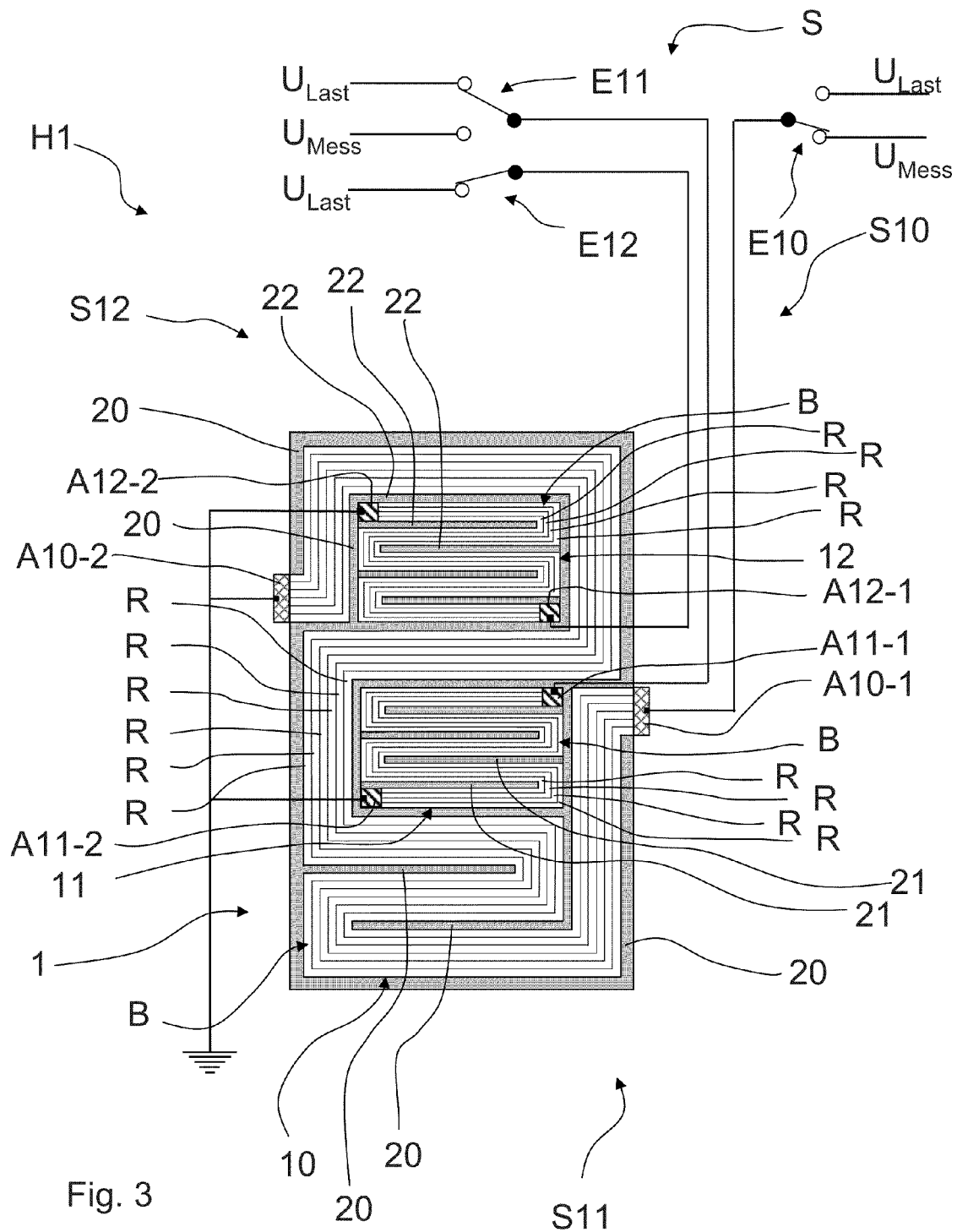

In a further implementation of the invention the energy supply device 21 of the heating system 1 comprises a measuring-voltage supply device for applying a measuring voltage that is lower than the voltage for heating the heating layer. As an example FIG. 2 shows an exemplary embodiment of a heating system S11 with a heating layer 11 for use in a heating system according to the invention, and as a further example FIG. 3 shows a combination of three heating systems S10, S11, S12 with a total of three heating layers 10, 11, 12 for use in a heating system according to the invention. The heating layer 11 according to FIG. 2 comprises a shape by means of which the heating layer can be used for a combination of heating layers according to FIG. 3 and can be integrated in the aforesaid.

With these embodiments of the heating layers used in this arrangement, the heating layers in each case comprise a plurality of rovings R that are arranged side by side and that form a ribbon B, which rovings R extend in a meandering manner. For this purpose, sections of the heating layers 10, 11, 12, which sections extend parallel to each other and side by side, are electrically insulated from each other by insulation devices 20, 21 or 22 comprising electrically non-conductive material. The term "meandering" relates to a course of rovings R or of the ribbon B of rovings R, in which longitudinal sections of the same ribbon B or of the same rovings R extend in opposite directions in relation to the coordinates for describing the extension in a sheet-like manner of the electrically insulating layer onto which the rovings R are laid, so that sections of curvature are provided between these longitudinal sections, wherein sections of curvature that follow on in longitudinal direction of the rovings R or of the ribbon B comprise curvatures that extend in opposite directions. Expressed in other words, in this context the term "meandering" refers to an arrangement in which longitudinal sections of the same roving are laid side by side and parallel to each other, wherein in each case longitudinal sections that are arranged side by side are longitudinal sections which in longitudinal extension of the roving are arranged one behind the other, so that a meandering or serpentine course of the roving results.

According to an embodiment of the invention, a temperature determination and a determination of the integrity of the heating layer takes place by permanently measuring the load current of the heating layer that represents a load resistance. In the case of an increase in the temperature of the heating layer on the basis of the current flow through the load resistance, the load current rises because the overall electrical resistance of the heating layer drops. This results in a progressive rise in the temperature of the heating layer. For detecting the integrity of the heating layer or for detecting structural damage for the purpose of structural health monitoring, measuring the overall resistance of the heating layer takes place, which overall resistance increases if the structure of the heating layer is damaged, because in this case the cross section of said heating layer is then locally smaller.

Figure 4:
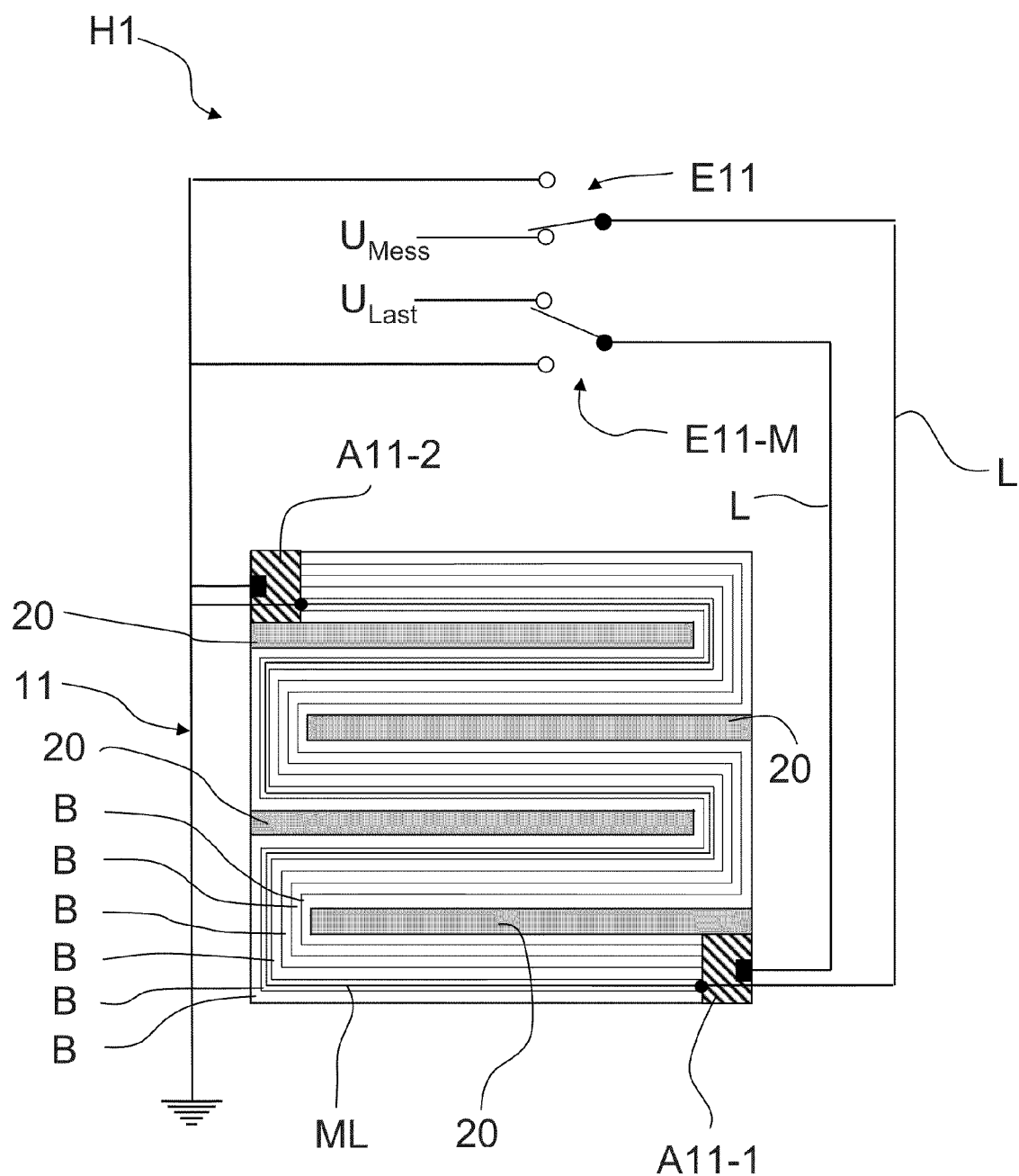
Figure 5:
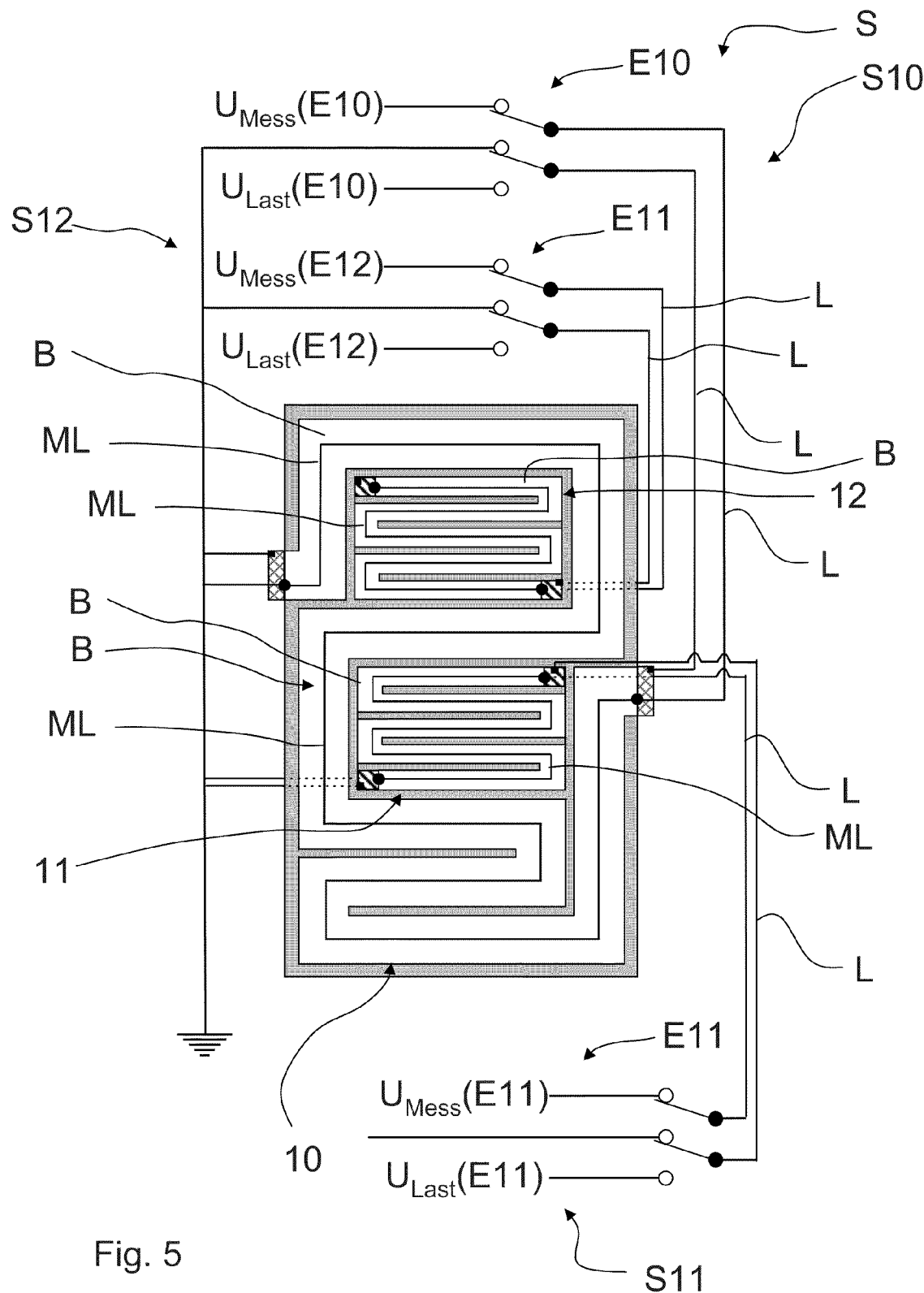

As an alternative or in addition, measuring the temperature of the heating layer and measuring the integrity of the heating layer can take place by the application of a measuring voltage or by means of a measuring line ML integrated in the heating layer (FIGS. 4 and 5).

In the embodiment of FIG. 2 an energy supply device E11 comprising a measuring-voltage supply device for generating the measuring voltage $U_{Mess}$ and comprising a load-voltage supply device for generating the load voltage $U_{Last}$ is provided, which supply device E11 is connected to the heating layer by means of two electrical connecting devices A11-1, A11-2. In an analogous manner in the embodiment of FIG. 3 for the purpose of supplying three heating layers, three energy supply devices E10, E11, E12 are provided, each comprising a measuring-voltage supply device for generating the measuring voltage $U_{Mess}$ and a load-voltage supply device for generating the load voltage $U_{Last}$, which energy supply devices in each case are connected to the heating layers 10, 11, 12 by means of two electrical connecting devices A10-1, A10-2; A11-1, A11-2; A12-1, A12-2.

In an exemplary embodiment of the heating system 1, said heating system 1 further comprises: a control device, which is coupled to the load-voltage supply device and the measuring-voltage supply device, which control device controls the aforesaid for applying the load voltage and the measuring voltage, and which control device comprises a control function by means of which the load voltage can be set to zero, i.e. at least to a value that in the measuring method according to the invention is negligible, and subsequently the measuring voltage is applied. In this arrangement the measuring device is, in particular, provided for measuring a resistance that is caused by the measuring voltage. The points in time of applying the load voltage and the measuring voltage can, in particular, be provided according to a constant frequency.

In one application case the structural component on which the heating layers of the heating system according to the invention are arranged can be the component of an aircraft so that the heating system or the heating layer according to the invention can, in particular, reduce or prevent ice formation on the surface of the structural component. The structural component can, in particular, be an aerodynamic body, subjected to airflow, of the aircraft, for example a wing, a wing flap, a leading-edge flap, a control surface or a vertical stabiliser. In particular, the aerodynamic body or the surface to which the heating layer can be applied can be a surface that faces the airflow, or a surface in communication with such a surface that faces the airflow (FIG. 1). Generally speaking the aircraft can be a fixed wing aircraft or a rotary wing aircraft. In this arrangement the heating layer can also be applied to the surface of a propeller or of a rotor.

FIG. 1 shows a leading-edge flap of an aircraft as an example of these applications. On a surface 3 of the component 1 or of a base body 4, which in the exemplary embodiment is a shell component 4 of the leading-edge flap 1, two heating layer arrangements H1, H2 are integrated, each comprising a base heating layer 10 and a plurality of inner heating devices or additional heating layers 11, 12 arranged within the base heating layer 10. The base heating layer 10 and the at least one additional heating layer 11 are designed as electrothermal heating layers so that they are designed to be at least to some extent electrically conductive and to generate heat when correspondingly supplied with electrical current. In order to electrically insulate, from the structural component, the base heating layer 10 and the at least one additional heating layer 11 in an arrangement on a structural component to be heated, an electrically insulating insulation- or separation device 20 is arranged between the base heating layer 10 and the at least one additional heating layer 11, 12. Furthermore, insulation- or separation devices 20 are provided between adjacent sections of a ribbon B of rovings R within a base heating layer 10 or an additional heating layer 11, 12 (FIGS. 2 and 3). The insulation- or separation devices 20 can also form part of the structural component on which the base heating layer 10 and the additional heating layers 11, 12 are arranged, or they can be separate components. The insulation- or separation devices can comprise glass. Furthermore, all the heating layers 10, 11, 12 are arranged on an insulation layer so that the heating current flowing in the heating layers is insulated from the part of the component 1 on which the heating layers 10, 11, 12 are arranged.

In this exemplary embodiment six rovings R are laid side by side onto the substrate material and are structurally integrated in said substrate material. Along their entire longitudinal extension the rovings R are placed side by side, in other words, when viewed in the direction of thickness of the heating layer, no longitudinal section of a roving R is positioned above or below a longitudinal section of another roving R of the same ribbon B of rovings. The rovings R extend parallel to each other and in a meandering manner in the heating layer 11. In this meandering laying pattern, in which the ribbon B of rovings R is arranged according to the embodiment of FIG. 2, there are longitudinal sections 11a, 11b, 11c, 11d, 11e of the ribbon B of rovings R, which longitudinal sections 11a, 11b, 11c, 11d, 11e extend parallel to each other. At its ends the ribbon B of rovings R is connected to a connecting piece Al 1-1 or Al 1-2, which in each case in turn is connected, by means of a line L11-1 or L11-2, to a current supply or voltage supply E. Thus, current can be supplied to the heating layer 11 by means of the energy supply device E so that in accordance with this current supply the heating layer 11 can give off heat to the component and its surroundings.

The shell component 4 can, in particular, comprise a fibre-reinforced material (FRM) or a fibre-reinforced plastic (FRP). The heating layers provided depending on the embodiment are arranged on an electrically non-conductive layer in such a manner that the heating layers are insulated from the remaining sections of the shell component.

Generally speaking, the heating layers 10, 11, 12 can have been applied as a separate part on the component, or they can have been produced in one piece with said component. In this arrangement the component can at least in the region of the heating layer comprise a semi-finished carbon fibre product. In a further method-related step the semi-finished products can be produced by means of a resin-injection method or infusion method to form a uniform or single-piece component.

The insulation layers arranged on the structural component to be heated can, in particular, comprise glass, aramid or plastics, and in particular a glass fibre plastic (GFP). Furthermore, the insulation layers can also be connected to each other or form a uniform insulation layer. Moreover, the insulation layers or individual insulation layers can in each case form an integral part of the structural component to be heated. In this arrangement the insulation layers can individually or in total, or an insulation layer can uniformly or in a single piece, be formed, and in particular produced, with the structural component to be heated. In particular, it can be provided for the structural component to be heated or for a shell component of said structural component to comprise an electrically non-conductive material, in particular a glass fibre plastic (GFP), a fibre-reinforced material (FRM), a fibre reinforced plastic (FRP) or a metallic material. In this arrangement the structural component to be heated, or the shell component of said structural component, can itself be the insulation layer or can comprise the insulation layers.

The at least one heating layer arranged on the component preferably comprises a carbon material, wherein said heating layers are electrically connected by means of electrical connecting devices, and carry an electric current when a corresponding voltage is applied, so that the aforesaid can be heated accordingly. In particular, the at least one heating layer can comprise electrically conductive rovings in a predetermined structure and density, or can comprise a bundle or a compound structure or ribbon of rovings.

In this context the term "roving" refers to a bundle comprising endless carbon filaments or electrically conductive cables that can be contained in the roving in a non-rotated and/or stretched manner. In this arrangement the cables can, in particular, comprise electrical conductors, for example metallic conductors, encased by means of glass fibres. The electrically conductive individual filaments can comprise carbon filaments and/or carbon fibres and/or metallic alloys and/or glass fibres, for example with a metallic coating. Furthermore, the rovings can, in particular, exclusively comprise fibres, and in particular carbon fibres. The rovings can be provided with or without matrix material. In this arrangement materials in the form of endless rovings, endless yarns, endless twisted yarns, endless strings, endless knitted fabrics, endless woven materials, endless cords or endless knit fabrics can be used for the rovings used according to the invention. For use with the method according to the invention, such endless rovings can be wound on reels or drums in order to remove from them rovings in suitable lengths for application in the method according to the invention.

In further exemplary embodiments of the invention, according to the invention a roving can also be made from several rovings which in these cases are subordinate rovings. In this arrangement the subordinate rovings can, in particular, be interlaced or intertwisted. In this context, such a combination comprising a plurality of subordinate rovings, which do not have to extend in a planar position, is referred to as a "bundle of rovings".

The rovings can have been laid in various ways on the respective insulation layer. In this arrangement the rovings can have been laid on the insulation layers in such a manner that the surfaces of the rovings to the greatest extent possible fill out the insulation layers that extend in a sheet-like manner, while at the same time the individual sections of the rovings are insulated from each other by means of non-conductive materials, in particular woven glass fabric or plastic foil, which materials are placed between said sections.

In order to form the heating layer, rovings can be arranged as individual rovings or as at least one compound structure or as at least one ribbon of rovings. In this context the term "ribbon of rovings" refers to an arrangement of rovings which extend in their longitudinal direction side by side, which rovings thus when viewed in the direction of thickness of the heating layer at none of their longitudinal sections have been placed one on top of the other. In this context the term "compound structure of rovings" refers to an arrangement of rovings which in their longitudinal direction extend side by side or one on top of the other, which rovings thus, when viewed in the direction of thickness of the heating layer, are at least on one of their longitudinal sections placed one on top of the other.

Within the heating layer, rovings can overlap in sections; in other words, when viewed in the direction of thickness of the heating layer, longitudinal sections of the rovings can be placed one on top of the other. However, in an exemplary embodiment of the invention, for the purpose of forming a heating layer, the rovings are arranged in such a manner that, when viewed in the thickness direction of the heating layer, none of the longitudinal sections of the rovings are placed one on top of the other.

In each case an electrically conductive connecting piece can be connected to the end pieces of the roving, which end pieces are situated in longitudinal direction of the roving, by means of which connecting piece in turn the electrical lines L are interconnected and connected to the energy supply device. Consequently, by means of the control function of the energy supply device current can flow through the roving at a predetermined current intensity and in a predetermined time period in order to heat said roving and thus the component on which the roving is arranged. In principle, when viewed in the direction of thickness of the component, several rovings can be arranged one on top of the other, which rovings can extend parallel to each other or in a contrary direction to each other.

The rovings or the at least one bundle or ribbon of rovings can extend parallel to each other and in an oscillatory manner. In principle, when viewed in the direction of thickness of the component, several rovings can be arranged one on top of the other, which rovings can extend parallel to each other or in a contrary direction to each other.

Other forms, in which rovings or at least one bundle or ribbon of rovings can be arranged to form a heating layer of a heating system, are to be provided according to the requirements of the respective application case.

As shown in FIGS. 2, 3, 4 and 5, the respectively shown heating system S, S10, S11, S12 comprises an energy supply device with a measuring-voltage supply device for generating the measuring voltage $U_{Mess}$ and with a load-voltage supply device for generating the load voltage $U_{Last}$, which energy supply device, by way of lines L, is connected to the heating layer by means of two electrical connecting devices. Thus the heating system S11 shown in FIGS. 2 and 4 comprises an energy supply device E11 with a measuring-voltage supply device for generating the measuring voltage $U_{Mess}$ and with a load-voltage supply device for generating the load voltage $U_{Last}$, which energy supply device is connected to the heating layer with two electrical connecting devices A11-1, A11-2. In an analogous manner, in the embodiment according to FIGS. 3 and 5, for the purpose of supplying three heating layers, three energy supply devices E10, E11, E12 are provided, in each case comprising a measuring-voltage supply device for generating the measuring voltage $U_{Mess}$, and a load-voltage supply device for generating the load voltage $U_{Last}$, which in each case by means of two electrical connecting devices A10-1, A10-2; A11-1, A11-2; A12-1, A12-2 are connected to the heating layers 10, 11, 12.

The energy supply devices E10, E11, E12 are designed in such a manner that they comprise a measuring-voltage supply device for applying a measuring voltage, which measuring-voltage supply device is connected to the electrical conductor by way of measuring line connections. In the exemplary embodiments of FIGS. 2 and 3 the measuring voltage and the load voltage are sequentially applied to the respective heating layer so that measuring the resistance takes place when the measuring voltage is present in the respective heating layer. Since a dedicated measuring line ML is integrated in the heating layers of the embodiments of FIGS. 4 and 5, the measuring voltage can be applied to the respective heating layer even when the load voltage is applied to the respective heating layer. The measuring device is provided for measuring a current intensity, caused by the measuring voltage, in the measuring line. The measuring voltage used in this arrangement can, in particular, be lower than 1/10th of the voltage for heating the heating layer 10, 11, 12.

In the exemplary embodiments shown in FIGS. 4 and 5, the design of which corresponds to that of the heating layers of FIG. 2 or 3, in each case an electrical line ML has been inserted or integrated in the heating layer 10, 11 or 12 for the purpose of measuring the resistance or a change in the resistance. For the sake of clarity, in the figures the ribbons B of the heating layers are shown without the rovings R. The heating system according to this exemplary embodiment thus comprises at least one electrothermal heating layer, wherein in the at least one electrothermal heating layer there is an electrical measuring line that is integrated in the heating layer.

The measuring line of the exemplary embodiments according to the invention can comprise an individual electrical conductor, a roving, a bundle or ribbon of rovings.

When a combination of heating systems is used, as shown in FIG. 5, it is not necessary for a measuring line ML to be integrated in each heating layer. Depending on the application case, it is also possible for a measuring line ML to be integrated only in one of the heating layers or in several of the heating layers.

The heating systems shown are shown as planar heating layers; however, after application on a structural component they comprise any desired three-dimensional shape. In the embodiment of the combination which in each case comprises a base heating layer 10 and two additional heating layers 11, 12 according to FIGS. 3 and 5, which combination is shown in FIG. 4, the outer heating device 10 and the two additional heating layers 11, 12 are rectangular in shape. Generally speaking, these heating devices can also comprise some other shape; for example a round or elliptical shape. The heating layers 10, 11, 12 are in each case connected to an energy supply device E10, E11 or E12 and in each case form a heating system S, S10, 311 or S12.

In particular, the base heating layer 10 is connected to the energy supply device E10 by way of electrical connecting devices A10-1, A10-2, wherein the electrical connecting devices A10-1, A10-2 electrically connect the rovings R by the ends of the ribbon B. The connecting devices A10-1, A10-2 are connected to the energy supply device E10 by means of lines. In an analogous manner the rovings R, too, at the ends of the ribbon B of the two additional heating layers 11, 12 are in each case connected by means of an electrical connecting device A11-1, A11-2 or A12-1, A12-2, which in each case are connected to the respectively associated energy supply device E11, E12 by way of electrical lines.

By means of the energy supply devices E10, E11, E12 a load voltage can be applied to each of the heating systems S10, S11, S12 independently of each other, which load voltage in each respectively associated heating layer 10, 11 or 12 causes an electrical heating current with current intensities that are different, and independent of each other. The overall heating system S, which is formed from the heating systems S10, S11, S12, can thus control the surface 3 of the component 1 differently in different regions, both in relation to the heating output and to the time. In this arrangement, the energy supply devices E10, E11, E12 can, in particular, be designed in such a manner that for a relatively short time relatively high load voltages are applied to the additional heating layers 11, 12, and that relatively low load voltages are applied to the base heating layer 10 over relatively long periods of time. With such a system design it is possible to attain a device which heats relatively large areas in an efficient manner in terms of energy with a relatively good heating effect. One application case of such an arrangement relates, in particular, to de-icing or to the prevention of ice formation on surfaces of aerodynamic bodies.

The base heating layer 10 and/or the at least one additional heating layer 11, 12 can be arranged on the inside or on the outside of the structural component 1 to be heated, or of a shell component 4 of the structural component to be heated. It can also be provided for the base heating layer 10 to be arranged on the outside of a structural component or shell component, and for at least one additional heating layer 11, 12 to be arranged on the inside of the shell component, and vice versa.

If rovings are used, other laying patterns or arrangement of rovings or of at least one ribbon or compound structure of rovings can be provided to form a heating layer 10, 11, 12. A laying pattern also results in a length of the respective roving or the respective bundle or ribbon of rovings, and thus in a specific electrical resistance of the aforesaid.

Figure 6:
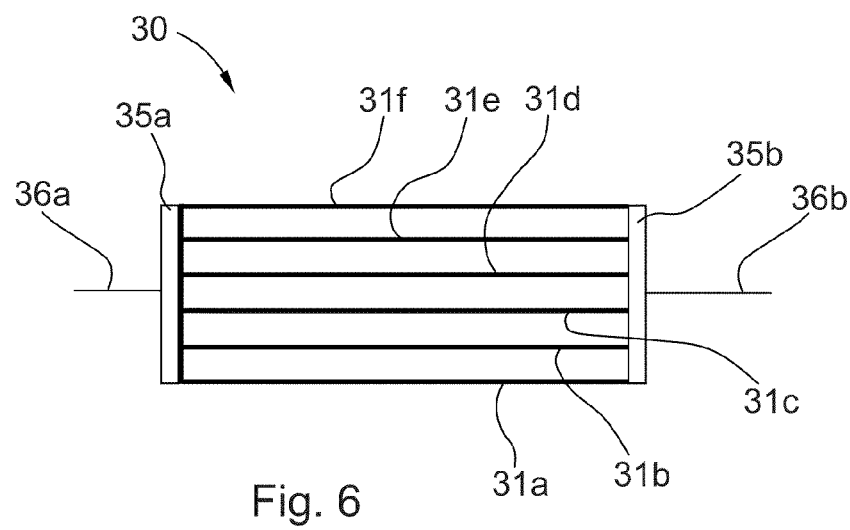

FIGS. 4 to 6 show various laying patterns as examples. In the example of FIG. 4 a roving arrangement 30 comprising six rovings 31a, 31b, 31c, 31d, 31e, 31f has beeng laid in a straight line and side by side in a parallel manner, wherein between the rovings, i.e. across their longitudinal extension, in each case a gap 37 is provided as an insulation region. At their ends, the rovings are connected to a linking or connecting piece 35a or 35b which electrically contacts and connects said rovings, which linking or connecting piece 35a or 35b in each case in turn is connected to a current supply or voltage supply (not shown) by means of a line 36a or 36b. Instead, it can also be provided for several bundles or ribbons of rovings to be arranged side by side as part of a heating layer, which bundles or ribbons of rovings are then, in particular, spaced apart from each other. The bundle or ribbon of rovings can have been laid in various designs in order to form the heating layer. FIG. 5 shows an arrangement 40 of bundles or ribbons 41 of rovings as part of a heating layer, which bundles or ribbons 41 along their longitudinal direction extend in a sinusoidal manner and parallel to each other. Furthermore, FIG. 6 shows two heating layers H-A, H-B in each case with a meandering laying pattern and in each case an arrangement 60a, 60b of a ribbon 61 of rovings as part of the respective heating layer. The ribbons 61 of rovings are electrically connected in series because the ends 65b, 65c of the ribbons 61a, 61b are in each case electrically interconnected by way of a connecting line 66, and the respective other ends 65a, 65d of the ribbons 61a, 61b are in each case connected to a current supply or voltage supply (not shown) by way of an electrical connecting line 67a, 67b.

The electrical connecting device A10-1, A10-2, A11-1, A11-2 and A12-1, A12-2 provide for contacting of the carbon fibres of the laid electrically conductive material with the lines that lead to the energy supply devices. In this arrangement it can, in particular, be provided for implementation of a connection from a metallic contact body to the end sections of the electrically conductive rovings R, which end on the boundary side or on the boundary cross section and comprise end surfaces. For example, the rovings have been laid onto the substrate component in such a manner that, for the purpose of contacting, their ends extend beyond the substrate component. In this arrangement a current conducting, and in particular a metallic, contact body is electrically connected to the end sections of the electrically conductive rovings. The contact body can, in particular, be panel-shaped or foil-shaped in order to prevent, when current is fed to the electrically conductive rovings, the occurrence of excessive electrical contact resistance and the associated locally high voltage drops. The contact body can, in particular, be a copper foil. The connection between the contact body and the electrically conductive rovings can take place by means of an adhesive that comprises metal. In this arrangement the metal contained in the adhesive can be in the form of metal particles. The substrate material of the adhesive can, in particular, comprise an electrically conductive polymer.

In the embodiments of the invention the rovings, and, in particular, respective end sections of the rovings, can thus comprise a polymer, and in particular an epoxy resin, which comprises metallic particles, e.g. comprising silver or copper. The particle size is preferably smaller than 45 microns. The viscosity is between 1,800 and 3,500 cPs. The polymer can, in particular, be a thermoplastic polymer, a duroplasic polymer, or an elastomer. During the production of the contact arrangement the polymer is applied in its liquid state to the ends of the rovings, or the ends are impregnated, and is connected to the conductors of the supply device or of the measuring device. Subsequently the polymer is cured. This results in contacting not only of the end cross sections of the rovings or their filaments, but also, depending on the manner in which the polymer has been applied, to contacting an end section of the rovings or filaments over a predetermined length in their longitudinal direction. By means of such an implementation of contacting, at a temperature of 23 degrees Celsius a volume resistance of less than 0.0004 Ohm-cm can be achieved.

According to a further aspect of the invention, the evaluation device for determining the electrical resistance of the heating layer 10, 11, 12 can be integrated in a flight control device. In this arrangement the measuring device can be in functional connection with a sensor-value processing device that comprises a comparison function that compares temperature values with at least one comparison value and sends a signal value to a system function when the limiting value is achieved or the value drops below the limiting value. The limiting value can, in particular, correspond to a lower temperature value which is defined in such a manner that at this temperature, speed and determined air parameters, ice formation on the exterior surface 5 of the shell component 4 is possible or probable.

As an alternative or in addition, the sensor-value processing device can comprise a monitoring function which for the purpose of determining the possibility of ice forming on the exterior surface 5a is designed in such a manner that it receives air data and in particular data relating to the external temperature, the flight altitude and/or to the air pressure, and by means of the sensor values determines the probability limiting value relating to the probability of ice formation occurring. In this exemplary embodiment the sensor-value processing device comprises a comparison function which compares the determined probability value relating to ice formation to a setpoint probability relating to ice formation to determine the maximum permitted probability of ice formation, and when the setpoint probability value is exceeded sends a signal value as a warning signal to a system function, for example to a flight control system or a cockpit display. The cockpit display can be designed in such a manner that it indicates to the pilot that the flight state should be changed and in so doing, for example, the flight altitude needs to be reduced in order to prevent ice build-up on the shell component 5.

With the use of at least one heating system on the component 1 according to the above-mentioned exemplary embodiments, the system function that is functionally coupled to the sensor-value processing device can continue to be designed as a regulating function for regulating the temperature of the respective heating layer or of the acquired region of the shell component 5. In this arrangement the system function receives from the sensor-value processing device the temperature values that were determined from determined resistance values and compares the aforesaid to a reference value or a temperature as a regulating variable. This reference value or temperature value is above a temperature at which ice formation on the shell component 5 can occur or at which said ice formation can be prevented. The regulating function is functionally connected to the sensor-value processing device and from it receives the temperature values as input variables that were determined from determined resistance values. Furthermore, the regulating function controls the energy supply device in such a manner that the at least one heating layer is heated in such a manner that the respective heating layer or the respective region of the shell component adheres to a setpoint temperature if at all possible. Thus, on the basis of a setpoint temperature, the regulating function generates corresponding command signals relating to the respective heating layer, which command signals are transmitted to the respective energy supply device, which in a corresponding manner applies current to the at least one heating layer. If several heating layers are present, it is also possible to control several heating layers in order to regulate the temperature of the respective heating layer.

With the use of at least one heating system according to the above-mentioned exemplary embodiments, the system function can furthermore be designed in such a manner that in those cases where the heating device is switched on, and at the same time the limiting value that corresponds to the probability of ice formation on the shell component 5 is exceeded, said system function issues a warning signal. The heating device can be designed in such a manner that it can generate various heating levels, i.e. various levels of releasing heating output. In this case the system function can, in particular, be designed in such a manner that the warning signal is generated when the highest heating level of the heating device is operative, at which level the maximum thermal output is generated, while at the same time a limiting value that corresponds to the probability of ice formation on the shell component 5 is exceeded. The warning signal can be sent to a flight guidance display, and the latter can be designed in such a manner that it generates a recommendation, e.g. in the Flight Director, for the pilot, according to which recommendation the aircraft is to be brought to a flight state in which ice formation on the wing is avoided. As an alternative or in addition, it can be provided for the warning signal to be sent to a flight control device that comprises a control function by means of which the aircraft is brought to a flight state in which ice formation on the wing is avoided.

The warning signal can mean that the electrothermal heating body is defective. In an exemplary embodiment of the invention it can thus be provided for the monitoring function to determine whether the atmospheric conditions during failure of the electrothermal heating body can signify a critical situation for the aircraft. It can be provided that in an evaluation function the flight altitude and optionally the measured air temperature are used. If applying the evaluation function shows that from the inadmissible (i.e. excessive) probability of ice formation a critical flight situation can result, a warning is sent to the flight control system or to the cockpit display which displays to the pilot recommendations for action by means of which the pilot can bring the aircraft to a safer flight state. In this context it can, for example, be displayed that the flight state needs to be changed and in so doing, in particular, the flight altitude needs to be reduced in order to prevent ice formation on the wing. As an alternative or in addition it is also possible for an automatic control function to be realised, which control function automatically implements these measures.

With reference to the figures a further aspect of the invention is described, according to which a structural component comprising a heating system S with at least one energy supply device E10, E11, E12 is provided. The heating system S comprises:

a base heating device comprising an insulation layer with an electrothermal base heating layer 10 arranged thereon which comprises at least one bundle or one compound structure or one ribbon of rovings, and with an electrical connecting device A10-1, A10-2 by way of which the at least one energy supply device E10, E11, E12 is connected to the base heating layer 10, wherein in each case the ends of each rovings are connected to an electrode of the electrical connecting device, an additional heating device comprising an insulation layer with an electrothermal additional heating layer 11 arranged thereon which comprises a bundle or a compound structure or a ribbon of rovings, and with an electrical connecting device A11-1, A11-2, by way of which the energy supply device E10, E11, E12 is connected to the additional heating layer 11.

In this arrangement, for the purpose of providing a functionally cohesive heating effect, the base heating device and the additional heating device are spatially associated with each other, and the energy supply device E10, E11, E12 is designed in such a manner that in the activation phase current is supplied during at least a partial period of time to the additional heating layer 11 in order to heat the structural component in the region of the additional heating layer to a supposed setpoint temperature, and that, above and beyond the activation phase, current is permanently supplied to the base heating layer 10 so that the base heating layer generates heat permanently, while the additional heating layer 11 generates heat in the partial period of time.

The above-mentioned heating layers can, in particular, form an integral and load-transmitting part of the structural component and in this arrangement can, in particular, have been produced according to the method according to the invention. The heating layers and the base heating device with an insulation layer and additional heating device with an insulation layer are designed according to an exemplary embodiment of the invention and have been described above.

According to an exemplary embodiment of the invention, the intensity of the current in the second periods of time is higher by 50% (a value should be mentioned in order to render the details more specific) than the current that flows through the base heating layer 10. In this arrangement it can, in addition, be provided for the current during partial periods of time for heating to be greater than the current at the base heating layer 10. The notion of the flow of a "significantly lesser" heating current means that in this arrangement the intensity of the current is less than 50% (see above) than that of the current that flows through the base heating layer 10.

The notion of "largely unchanging intensity" of an electrical current or of a "permanent" current supply refers to an electrical current whose intensity differs by a maximum of 25% from an average value or reference value of this current.

In this arrangement it can also be provided for current to flow in an intermittent or pulsating manner in the additional heating layer 11. The time period of the current intensity can be regularly periodic.

The heating system 1 can also comprise several additional heating layers 11 which are supplied with current in the described manner by the energy supply device 5, i.e. in first periods of time at a higher current intensity and in second periods of time at a lower current intensity than the intensity of the current that flows through the base heating layer 10. In this arrangement it can be provided for the first periods of time to be provided at the same time in all or in several base heating layers 10. As an alternative it can be provided for the first periods of time to be provided in a time-offset manner in all or several base heating layers 10.

For structural integration of the heating layers 10, 11, 12 provided according to the invention in a component 1 it can be provided for the material to form the respective heating layer to be applied to a semi-finished substrate component that comprises an electrically insulating material. The semi-finished substrate component is designed as a sheet-like or mat-shaped structure with the function of electrically insulating the rovings to be applied from the component on which the heating layer is to be arranged. The surface of the component on which the heating layer is to be arranged can, in particular, be a surface of a shell component.

In a further exemplary embodiment of the invention, the rovings R can be distributed over the area of a semi-finished substrate component, and thus over the surface 3 of the component 1 on which the heating layer is arranged, in such a manner that each roving R extends on the same laying plane when viewed in the thickness direction of the semi-finished substrate component or of the heating layer 10, 11, 12 to be formed. In other words in this arrangement no overlaying of individual rovings or overlaying of sections of said rovings in the above-mentioned thickness direction is permitted. This manner of arrangement is associated with an advantage in that, for example, the arrangement, the course, the thickness, the quality and/or the number of rovings can be optimised according to predeterminable optimising criteria. Furthermore, heating currents that change over time and that have high peaks in the heating layer are possible during some phases, because the temperatures that occur locally in the heating layer according to the invention can be controlled and, in particular, regulated. The rovings R arranged to form the heating layer can be arranged as a ribbon of rovings or a compound structure of rovings.

In this context the term "ribbon of rovings" refers to an arrangement of rovings which extend in their longitudinal direction side by side, which rovings, thus, when viewed in the direction of thickness of the heating layer, at none of their longitudinal sections are placed one on top of the other. In this context the term "compound structure of rovings" refers to an arrangement of rovings which in their longitudinal direction extend side by side or one on top of the other, which rovings thus, when viewed in the direction of thickness of the heating layer, are at least on one of their longitudinal sections placed one on top of the other.

In the completed component 1, the semi-finished substrate component, on which for the production of a heating layer according to the invention carbon conductors and, for example, a ribbon of rovings or rovings can be applied, serves as an insulation layer that is situated between the line region which comprises, for example, a compound structure or a ribbon of rovings. The component can form part of the insulation layer, or the insulation layer can comprise a material that has been additionally applied to the insulation layer. Such a material that has been additionally placed on the insulation layer can be a glass roving that is electrically non-conductive. In this exemplary embodiment it can, in particular, be provided that between two line regions, each comprising a roving or a compound structure of rovings with a width, when viewed in the sheet-like extension of the respective heating layer, of up to 10 cm and in particular of up to 3 cm, at least one glass roving is inserted.

The electrothermal layer, in particular if it is arranged at the top of the structural component or of the shell component, at its top can be covered by an electrically non-conductive layer that can comprise a woven glass fabric, textile material or plastic film or foil.

With an arrangement of the electrothermal layer at the top of the structural component or of the shell component, furthermore, the application of a lightning protection layer can be provided. When viewed in the direction of thickness of the structural component, the lightning protection layer is situated above the electrically non-conductive layer and can, in particular, be made from a stamped foil of bronze.

The electrically non-conductive insulation layers, in other words the first and if applicable the further insulation layers, can comprise a woven glass fabric, a textile material or an electrically non-conductive plastic film or foil.

An exemplary embodiment of an additional heating layer 11, 12 provided according to the invention is shown in FIG. 2 and has been described with reference to FIG. 2.

The component produced according to the invention is, in particular, suitable for application and integration in aircraft components or aircraft structures. As an example of such an application case, FIG. 1 shows such a component 1 in the form of a leading-edge flap. By means of the energy supply devices E10, E11, E12 it is possible to apply a load voltage to each of the heating systems S10, S11, S12 independently of each other, wherein the aforesaid in each respectively associated heating layer 10, 11 or 12 causes an electrical heating current with different current intensities that are independent of each other. The overall heating system S, which comprises the heating systems S10, S11, S12, can thus control regions of the surface 3 of the component 1 differently in terms of heating output and also in terms of time. In this arrangement the energy supply devices E10, E11, E12 can, in particular, be designed in such a manner that for a relatively short time relatively high load voltages are applied to the additional heating layers 11, 12, and that relatively low load voltages are applied to the base heating layer 10 over relatively long periods of time. With such a system design it is possible to attain a device which heats relatively large areas in an efficient manner in terms of energy with a relatively good heating effect. One application case of such an arrangement relates, in particular, to de-icing or to the prevention of ice formation on surfaces of aerodynamic bodies.

To form an electrothermal layer 10, 11, 12, in particular a ribbon B comprising rovings R can be laid in a meandering manner as shown in the exemplary embodiments according to FIGS. 1 and 2. The term "meandering" relates to a course of rovings R or of the ribbon B of rovings R, in which longitudinal sections of the same ribbon B or of the same rovings R extend in opposite directions in relation to the coordinates for describing the extension in a sheet-like manner of the electrically insulating layer on which the rovings R are laid, so that sections of curvature are provided between these longitudinal sections, wherein sections of curvature that follow on in longitudinal direction of the rovings R or of the ribbon B comprise curvatures that extend in opposite directions. Expressed in other words, in this context the term "meandering" refers to an arrangement in which longitudinal sections of the same roving are laid side by side and parallel to each other, wherein in each case longitudinal sections that are arranged side by side are longitudinal sections which in longitudinal extension of the roving are arranged one behind the other, so that a meandering or serpentine course of the roving results.

In principle the course of the rovings can also be determined by the form of the structural component and can be optimised on the basis of the aforesaid. For example, the course of one roving or of several rovings can be led around a recess, e.g. a hole for receiving a connecting element or supply openings or other interruptions in the surface of the structural component if at this location an electrothermal layer of a heating device is to be provided.

According to an exemplary embodiment of the invention, several additional heating layers are provided which are arranged beside and/or within a base heating layer 10 on the surface of a structural component, and which are connected to the energy supply device. In this arrangement the function of the energy supply device for controlling the current in the heating layers is designed in such a manner that, in relation to the current that respectively flows in the additional heating layers, in each additional heating layer first and second periods of time with different current intensities of the heating current form, which periods alternate. In this arrangement the current intensities in the respective first heating phases are significantly higher than are the current intensities in the respective second heating phases. For example, in a heating system comprising three additional heating layers the first heating phase occurs in sequence in the first, the second and the third additional layer, and during the occurrence of a first heating phase in a first additional layer, second heating phases occur in the respective two other additional layers.

However, during the change between a first and a second heating phase of two additional heating layers, overlaps in the heating phases can occur in such a manner that the current intensity according to a first heating phase in an additional layer still endures while already in a further additional layer likewise a current intensity according to a first heating phase occurs. Preferably, the period of overlap is a maximum of 10% of the duration of time or of the average value of the durations of time that is/are provided for the respective first heating phases. With this exemplary embodiment too it can be provided for the intensity of the current in the first periods of time to be higher by 50% (see above) than the current that flows through the base heating layer 10. Furthermore, in this arrangement it can be provided for the intensity of the current in the second periods of time to be to less than 50% (see above) than that of the current that flows through the base heating layer 10.

According to the invention, generally speaking, within the base heating layer 10 a plurality of inner heating devices are arranged, i.e. it is possible for more than two additional heating layers 11, 12 to be arranged within the outer heating device 10. The base heating layer 10, the additional heating layers 11, 12 are arranged on a base body 9 comprising an electrically insulating layer so that the heating layers 10, 11, 12 are situated above the insulating layer. In the embodiment of the combination in each case comprising a base heating layer and two additional heating layers 11, 12, which is shown in FIG. 1, the outer heating device and the two additional heating layers are rectangular. Generally speaking these heating devices can also have some other shape, for example they can be round or elliptical in shape.

The base body 9 can be a separate part or component that is applied to the component to be heated, or the base body can form part of the component to be heated. In the latter case the base body can be produced in a single piece with the component to be heated. In particular, the base body can be the exterior shell of a shell component and thus it can be the exterior shell of a shell component of a wing, of a flap or of a slat. In an exemplary embodiment of the invention the component to be heated is a component of an aircraft. In this arrangement the component to be heated can, in particular, be a component that comprises a part that projects into the airflow, for example the front, which projects into the airflow, of a tailplane, of a horizontal stabiliser, of a wing, of a winglet, of a slat or a leading-edge flap, or of the fuselage, of an engine or of an additional component attached to the aircraft.

As an example, FIG. 2 shows the arrangement of a base heating layer 10 and two additional heating layers 11, 12 on the front 21, or the section, which projects into the airflow, of a slat or of a leading-edge flap 20. To facilitate orientation, FIG. 2 shows an X1-X2-X3 coordinate system whose X1-axis is the direction of the wingspan, X2-axis is the direction of wing depth and X3-axis is the direction of wing thickness of the slat. As an example, the front 21 shows two combinations in each case comprising a base heating layer 10 and two additional heating layers 11, 12 that are arranged within said base heating layer 10. In this arrangement the two combinations in each case comprising a base heating layer 10 and two additional heating layers 11, 12 arranged within said base heating layer 10, or comprising a base heating device and two additional heating devices arranged within said base heating device, are arranged on the slat 10 in such a manner that the two additional heating layers 11, 12 are situated side by side when viewed in the direction of wing depth X2.

Generally speaking, a combination in each case comprising a base heating layer 10 and two additional heating layers 11, 12 that are arranged within said base heating layer 10, or several combinations in each case comprising a base heating layer 10 and two additional heating layers 11, 12 that are arranged within said base heating layer 10, can be arranged on the aircraft component such as a slat. In the arrangement of several combinations in each case comprising a base heating layer 10 and two additional heating layers 11, 12 arranged within said base layer 10 the aforesaid can, in particular, be arranged side by side in the wingspan direction X1 of the slat, and as an alternative or in addition also side by side in the direction of wing depth X2.

In the integration of the heating system according to the invention in an aircraft component, it can, in particular, be provided for the base body 4 to be an electrically insulating layer and to form part of the aircraft component, and in particular to form a shell component of the aircraft component.

The energy supply device 5 is electrically connected to the first 10a, to the first 11a and the second 11b electrical connecting devices of the first additional heating layer 11 as well as to the first 112a and the second 12b electrical connecting devices of the second additional heating layer 12. The energy supply device 5 is designed in such a manner that in an activation phase of the heating system 1 current is permanently supplied to the base heating layer 10, and current is supplied alternately in a predetermined manner to the first 11 and the second 12 additional heating layers, so that the first 11 and the second 12 additional heating bodies generate heat in a time alternating manner. By supplying current to the first additional heating body 11 and the second additional heating body 12 in a time alternating manner, said bodies are heated alternately. In this manner a heating effect relating to the surface of the entire base heating layer 10 takes place in an efficient manner in energy terms. Furthermore, the first additional heating layer 11 and the second additional heating layer 12 can comprise a material whose temperature when correspondingly supplied with current increases at a high temperature gradient because each additional heating layer 11, 12 is supplied only during a correspondingly short period of time with current for generating heat.

In the method according to the invention for producing a component comprising a heating layer or for producing a semi-finished product for a heating body for producing such a component it is provided for laying onto a semi-finished substrate component comprising an electrically non-conductive substrate material one or several layers of carbon rovings in the form of one or several layers of bundles or ribbons of rovings and/or of metallic conductors in a predetermined laying pattern, and to fasten the aforesaid by means of an embroidery method.

In the use as intended of the component comprising a heating layer the rovings are connected to a current supply device and when a corresponding voltage is applied said rovings are used as ohmic conductors so that said rovings according to their specific resistance and the voltage applied produce a predetermined thermal output in order to heat up the component and/or the surroundings of the component in a predetermined manner.

In this context the term "roving" refers to a bundle comprising endless carbon filaments or electrically conductive cables that can be contained in the roving in a non-rotated and/or stretched manner. In this arrangement the cables can, in particular, comprise electrical conductors, for example metallic conductors, encased by means of glass fibres. The electrically conductive individual filaments can comprise carbon filaments and/or carbon fibres and/or metallic alloys and/or glass fibres, for example with a metallic coating. Furthermore, the rovings can, in particular, exclusively comprise fibres, and in particular carbon fibres. The rovings can be provided with or without matrix material. In this arrangement materials in the form of endless rovings, endless yarns, endless twisted yarns, endless strings, endless knitted fabrics, endless woven materials, endless cords or endless knit fabrics can be used for the rovings used according to the invention. For use with the method according to the invention, such endless rovings can be wound on reels or drums in order to remove from them rovings in suitable lengths for application in the method according to the invention.

In further exemplary embodiments of the invention, according to the invention a roving can also be made from several rovings which in these cases are subordinate rovings. In this arrangement the subordinate rovings can, in particular, be interlaced or intertwisted. In this context, such a combination comprising a plurality of subordinate rovings, which do not have to extend in a planar position, is referred to as a "bundle of rovings".

The rovings laid onto the semi-finished substrate component can also overlap in some sections, i.e. longitudinal sections of the rovings, when viewed in the direction of thickness of the heating layer, can be laid one on top of the other. However, in an exemplary embodiment of the invention the rovings are arranged in such a manner that at none of their longitudinal sections, when viewed in the direction of thickness of the heating layer, are they laid one on top of the other.

In order to form the heating layer, rovings can be arranged as individual rovings or as at least one compound structure or as at least one ribbon of rovings. In this context the term "ribbon of rovings" refers to an arrangement of rovings which extend in their longitudinal direction side by side, which rovings, thus, when viewed in the direction of thickness of the heating layer, at none of their longitudinal sections are placed one on top of the other. In this context the term "compound structure of rovings" refers to an arrangement of rovings which in their longitudinal direction extend side by side or one on top of the other, which rovings thus, when viewed in the direction of thickness of the heating layer, are at least on one of their longitudinal sections placed one on top of the other.

The semi-finished substrate component is designed as a sheet-like or mat-shaped structure with the function of electrically insulating the rovings to be applied from the component on which the heating layer is to be arranged. The semi-finished substrate component can, in particular, comprise a semi-finished textile product and in particular a woven fabric, e.g. a multi-axial interlaid scrim or a plastic material in the form of a film or foil or combinations thereof. The surface of the component on which the heating layer is to be arranged can, in particular, be a surface of a shell component. In this arrangement the rovings are distributed over the area of the semi-finished substrate component, wherein each roving extends on the same laying plane when viewed in the thickness direction of the semi-finished substrate component or the heating layer to be formed. In other words in this arrangement no overlaying of individual rovings or overlaying of sections of the same roving in the above-mentioned thickness direction is permitted. This arrangement method provides an advantage in that, for example, the arrangement, the course, the thickness, the quality and/or the number of rovings can be optimised according to predeterminable optimising criteria. Furthermore, heating currents that change over time and that in some phases have high peaks in the heating layer are possible because the temperatures that occur locally in the heating layer according to the invention can be controlled and in particular regulated.

The respective heating layers can comprise one or several layers of rovings or one or several layers of at least one bundle or ribbon of rovings and/or of metallic conductors in a predetermined laying pattern.

The component with a heating layer comprises an electrically insulating layer or is made from such a layer. Accordingly, for the production of the component a semi-finished substrate material and an electrically insulated material are used, or the semi-finished substrate material comprises an electrically insulating material. The electrically insulating material can, in particular, comprise glass, aramid or plastics.

The semi-finished substrate component can comprise a semi-finished textile material, in particular in the form of a woven material or of a multi-axial interlaid scrim or a plastic material that extends in a sheet-like manner, in the form of a film or foil.

The component produced according to the method according to the invention on the basis of a corresponding semi-finished component can in particular be a fibre-reinforced material and/or a fibre reinforced plastic component. Generally speaking, the component can comprise one or several heating layers. When several heating layers are provided, they can be controlled differently by an energy supply device and can thus be supplied with current. Furthermore, it can be provided for each of the heating layers to be controlled by one and the same energy supply device.

Figure 9:
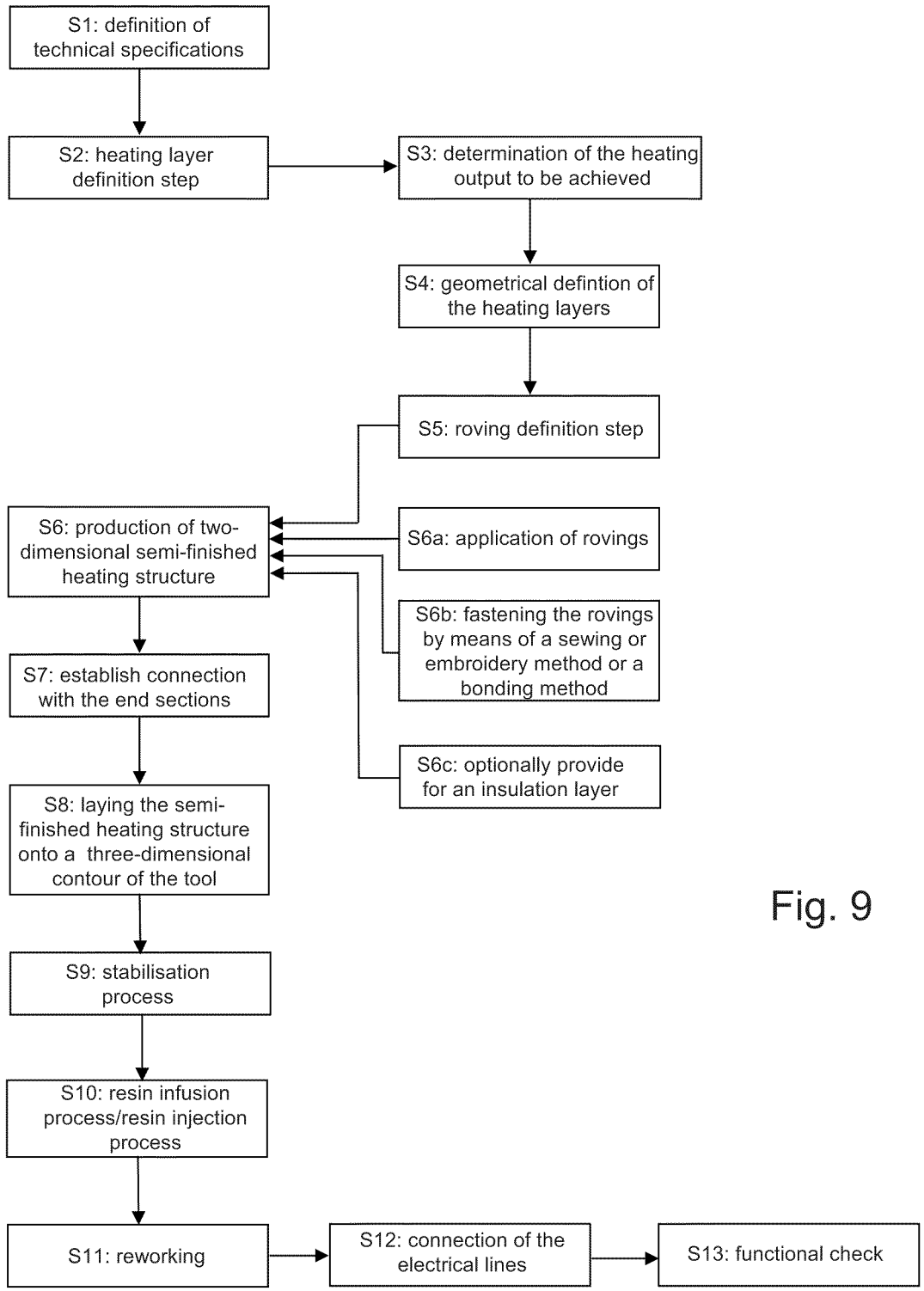

FIG. 9 shows an exemplary embodiment of a heating layer 11 produced according to the method according to the invention. In this exemplary embodiment six rovings R are placed side by side onto the substrate material and are structurally integrated in said substrate material. Along their entire longitudinal extension the rovings R are placed side by side, in other words, when viewed in the direction of thickness of the heating layer, no longitudinal section of a roving R is positioned above or below a longitudinal section of another roving R of the same ribbon B of rovings. The rovings R extend parallel to each other and in a meandering manner in the heating layer 11. In this meandering laying pattern, in which the ribbon B of rovings R is arranged according to the embodiment of FIG. 2, there are longitudinal sections 11a, 11b, 11c, 11d, 11e of the ribbon B of rovings R, which longitudinal sections 11a, 11b, 11c, 11d, 11e extend parallel to each other. At its ends the ribbon B of rovings R is connected to a connecting piece A11-1 or A11-2, which in each case in turn is connected, by means of a line L11-1 or L11-2, to a current supply or voltage supply E. Thus, current can be supplied to the heating layer 11 by means of the energy supply device E so that in accordance with this current supply the heating layer 11 can give off heat to the component and its surroundings.

The component produced according to the invention is, in particular, suitable for the application and integration in aircraft components or aircraft structures as has been described with reference to FIG. 3.

The additional heating layers 11, 12 can, in particular, be designed according to the exemplary embodiment shown in FIG. 2.

According to the invention, for producing the semi-finished component or the component, after a definition of technical specifications (step 1) in a step S2 to design the arrangement of the heating layers, in a heating layer definition step the geometric definition and/or the design of the heating layer or heating layers provided on the component to be manufactured are/is defined. In an exemplary embodiment of the method according to the invention, in this arrangement the starting point is provided by a component to be produced, which component has a predetermined three-dimensional shape. By means of investigations (step S3) and by means of electrical calculations and/or in simulations, analytical investigations and/or tests on a model of the component to be produced, the heating output of said component is determined, which output is to be achieved on the component to be produced by means of one or several heating layers. To this effect, in particular, operating conditions according to requirements can be simulated. One or several of the following criteria can be the result of these investigations:

the number and the arrangement of at least one heating layer to be provided on the component to be produced, wherein the arrangement of the at least one heating layer designates the position of the respective heating layer on the component;

the size of the respective heating layer; as well as the area-specific heating output to be achieved by each provided heating layer at a predetermined voltage provided to the heating layer, wherein the voltage can be time-constant or time-variable.

The result of the heating-layer definition step and in this arrangement in particular the determined area-specific heating output to be achieved can in an iteration process lead to an adaptation of the design of the heating layer or heating layers provided on the component to be provided, in other words to the adaptation of the number and the arrangement of at least one heating layer to be provided on the component to be produced and/or the size of the respective heating layer (step S4).

In these investigations it can be provided for the material of the substrate component to also be taken into account.

In an exemplary embodiment of the heating-layer definition step the arrangement, and in particular the position of the arrangement, of at least one heating layer and/or the size of the respective heating layer can be specified. Such specifications can result from the respective application case that is provided for the respective component to be produced. In this exemplary embodiment of the heating-layer definition step, based on such specifications, the area-specific heating output, which output is to be achieved, of the heating layers or of the respective heating layer, at a predetermined voltage that is provided to the heating layer, is determined on the basis of such specifications, for example in an optimisation method.

On the basis of the above-mentioned alternative definitions of the heating layers, a roving definition step (step S5) is then carried out during which step the definition of the design of the rovings or of the at least one bundle or ribbon of rovings on the at least one heating layer is carried out. This involves the determination of the type of arrangement of the electrically conductive rovings or of the at least one bundle or ribbon of rovings of the respective heating layer, the type and the number of rovings or of the bundle of rovings R of the respective heating layer, as well as of the ribbon of rovings and in this arrangement also the number of rovings of the at least one provided bundle or ribbon of rovings, wherein in this case also the characteristics of the bundle or ribbon of rovings are to be determined.

The type or the characteristics of the bundle or ribbon of rovings in particular also includes the cross-sectional dimensions and in this arrangement also the type of the rovings to be used in each case, in other words in particular their thickness and/or the number of the electrical conductors contained therein and/or the roving fineness (tex number). By means of the orientation of the electrical conductors, i.e. of the rovings or of the bundles or ribbons of rovings in the laying pattern and of the specific electrical resistance of the rovings or bundles or ribbons of rovings used, as well as by means of suitable electrical wiring, the overall electrical resistance can be variably set. It can also be specified that individual heating layers of the heating structure to be produced are heated cyclically or permanently.

The type of arrangement of the rovings can contain the determination stating in what manner and in what course the rovings are to be arranged in the heating layer as individual rovings or in bundles or ribbons of rovings. If the rovings are to be arranged in the heating layer as bundles or ribbons of rovings it is further determined how many rovings and what type of rovings are to be provided for each bundle and/or ribbon. The following can in particular be determined by the type of rovings: the thickness and/or the amount or the number of line components in cross section of the respective roving, and/or the number of layers, situated one on top of the other, of rovings or bundles or ribbons of rovings. With the type of arrangement it is also possible to determine whether gaps are provided between the rovings and/or between the bundles or ribbons of rovings. In these gaps or in the spaces resulting from them, to form an insulation device 20, 21, 22, insulation material, which can, for example, comprise glass fibre strands, can be in place in order to electrically insulate the rovings or bundles or ribbons of rovings from each other.

The type of arrangement can in particular contain the determination that a ribbon B comprising rovings R is to be laid in a meandering manner as shown in the exemplary embodiments according to FIGS. 2 and 4. The term "meandering" refers to a course of rovings R or of the ribbon B of rovings R, in which longitudinal sections of the same ribbon B or of the same rovings R extend in opposite directions in relation to the coordinates for describing the extension in a sheet-like manner of the electrically insulating layer onto which the rovings are laid, so that sections of curvature are provided between these longitudinal sections, wherein sections of curvature that follow on in longitudinal direction of the rovings R or of the ribbon B comprise curvatures that extend in opposite directions. Expressed in other words, in this context the term "meandering" refers to an arrangement in which longitudinal sections of the same roving are laid side by side and parallel to each other, wherein in each case longitudinal sections that are arranged side by side are longitudinal sections which in longitudinal extension of the roving are arranged one behind the other, so that a meandering or serpentine course of the roving results.

Figure 7:
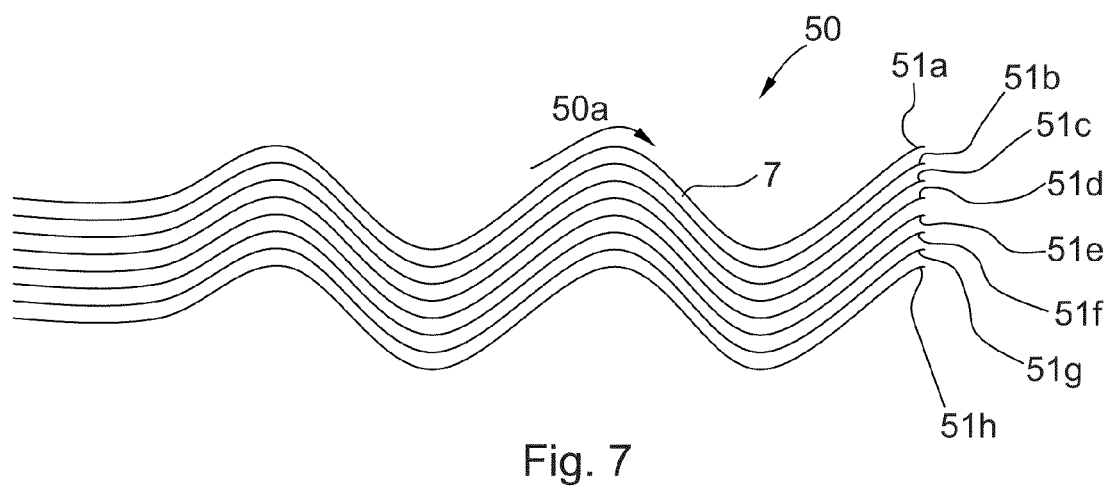
Figure 8:
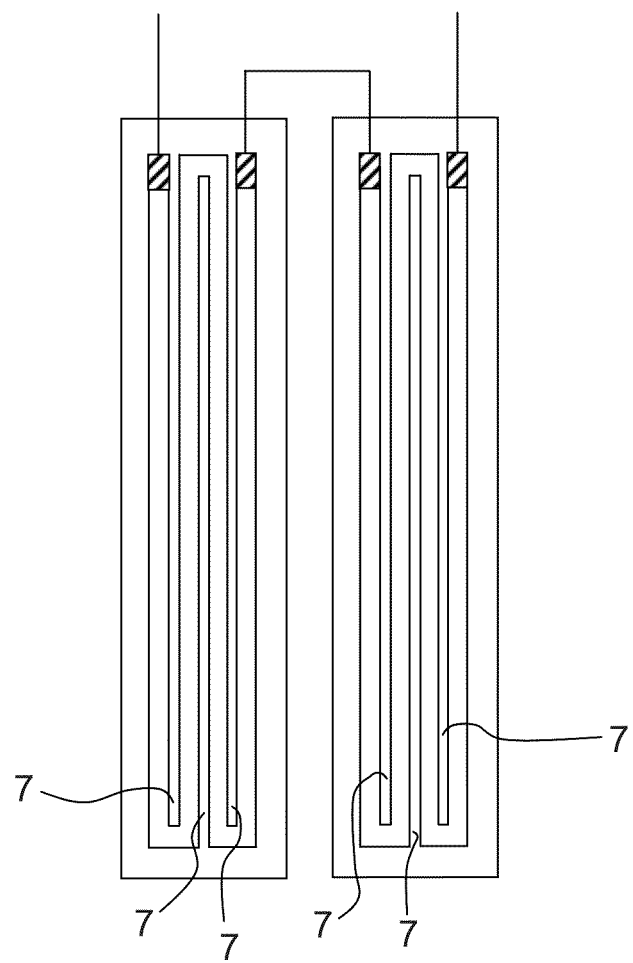

Furthermore, in the roving definition step the laying pattern of rovings and or at least of one bundle or ribbon of rovings is determined. A laying pattern also determines a length of the respective roving or of the respective bundle or ribbon of rovings and thus a specific electrical resistance of the aforesaid. FIGS. 6 to 8 show examples of various laying patterns which have been described above with reference to these figures.

The roving definition step can, in particular, comprise an optimisation process that can run in a computer-assisted manner. According to an exemplary embodiment of such an optimisation process, the following are entered as input values of the optimisation process: in the case where the rovings for forming the heating layer are to be laid individually, a type of arrangement or laying shape of the electrically conductive rovings; or in the case where bundles or ribbons of rovings for forming the respective heating layer are to be laid, an arrangement or laying shape of at least one bundle or ribbon of rovings.

In the variant of this exemplary embodiment, in which the heating layer is formed by the laying of individual rovings, the optimisation process implemented in a computer optimises, from the respective specification, the number of rovings of the respective heating layer. Apart from minimising the number of rovings, another optimisation objective can, in particular, also relate to the area coverage of the electrically conductive material or of the ribbon B of rovings R. In a further implementation, the optimisation process can be designed in such a manner that in addition it optimises and determines the type of rovings that are defined by the thickness and/or the cross section of the electrical conductors in the rovings.

In the other variant of this exemplary embodiment, which variant can be provided as an alternative or in addition to the above-mentioned variant, from the respective above-mentioned specification, the optimisation process implemented in a computer determines the number of ribbons B of rovings and in this arrangement also the number of rovings of the at least one provided ribbon B of rovings. In a further implementation the optimisation process can be designed in such a manner that in addition it also optimises and determines the characteristics of the ribbon B of rovings.

The above-mentioned exemplary embodiments of the optimisation processes can be designed in such a manner that they are superimposed on a predetermined laying pattern or a predetermined laying shape of the rovings or bundles or ribbons of rovings to form a heating layer. In a further exemplary embodiment it can be provided for the determination of the laying pattern or of the laying shape of the rovings or bundles or ribbons of rovings to take place within the framework and within the optimisation. This can be implemented in such a manner that above-mentioned optimal results of predetermined laying patterns are determined, and these optimal results are determined together. From the comparison of the optimal results the best optimal result is filled with a determined laying pattern.

This optimisation can be carried out in relation to the two-dimensional shape of the heating layer, which is produced from the three-dimensional component, for example on the basis of unwinding from the surface of said three-dimensional component. As an alternative it can further be provided for optimisation to be carried out in relation to the three-dimensional heating layer which corresponds to the three-dimensional shape of the component on the region provided for the heating layer.

According to an exemplary embodiment of the invention, the production of a two-dimensional semi-finished heating-structure product comprising rovings (steps S6 and S7) is provided for the purpose of producing from it a three-dimensional semi-finished heating-structure product (steps S8 and S11). In this arrangement, the laying of the electrically conductive rovings or of the bundles of rovings R or of the ribbons B of rovings R onto the application surface of the substrate component or the semi-finished substrate material, which is provided to form the substrate component of the component to be produced, can take place by machine, and in particular automatically or in a CNC-controlled manner (step S6). In order to produce a two-dimensional semi-finished heating-structure product, at least one electrically conductive roving and/or at least one bundle of rovings and/or at least one ribbon of rovings (step 6a) is/are applied to an electrically insulating layer of a semi-finished substrate component, which is clamped in a machine, and is fastened to the semi-finished substrate component.

Fastening the rovings can in particular take place by means of a sewing and/or embroidery method. Fastening the rovings on the semi-finished substrate component by means of a sewing or embroidery method (step 6*b*) can, in particular, take place individually or in groups. In other words, it can be provided for each roving or each bundle of rovings or in each case a ribbon of rovings to be fastened individually to the semi-finished substrate component by means of an embroidery method, and/or for several rovings together to be fastened to the semi-finished substrate component by means of an embroidery method. In the case of fastening the rovings in groups it is in particular provided for, in particular, groups of up to three rovings to be fastened together, and for subsequently one roving or several rovings to be applied and fastened. In the case of individual fastening of the rovings to the semi-finished substrate component it can additionally be provided for groups of rovings to be fastened to the semi-finished substrate component by means of an embroidery method.

As an alternative or in addition, it can be provided for an individual roving to be fastened to the semi-finished substrate component by means of a bonding method, or for several rovings, a ribbon or bundle of rovings to be fastened to the semi-finished substrate component.

In an exemplary embodiment at least one bundle of rovings or ribbon of rovings is, or the bundles of rovings or ribbons of rovings are, gradually formed during laying of the rovings and during fastening thereof to the substrate material. In other words, in this exemplary embodiment the rovings are gradually laid side by side on the substrate material until said rovings form a bundle or ribbon of rovings on the substrate material. During fastening of the rovings to the substrate material it can be provided for rovings to be fastened to the substrate material individually, and/or for several rovings as a group or bundle of rovings to be fastened to the substrate material together. In a further exemplary embodiment, prior to laying the rovings it can be provided for said rovings to be taken together in one or several bundles or ribbons and to be fastened together. Fastening rovings among themselves prior to laying can take place using embroidery methods, sewing methods and/or bonding methods. Subsequently, the prefabricated bundle or ribbon of rovings is laid onto the substrate material, and the bundle or ribbon of rovings is fastened to the substrate material. In particular, fastening of rovings, of a bundle or of a ribbon of rovings to the semi-finished substrate component can take place by means of an embroidery method, sewing method and/or bonding method. In this arrangement it can be provided, in addition, for providing, between a layer of rovings or at least a ribbon of rovings R, an electrically insulating layer, in particular comprising a woven glass fabric, in order to electrically insulate (step 6*c*), from the substrate component of the component, the layer comprising electrically conductive rovings or bundles or ribbons of rovings.

During the laying of rovings (step 6*b* or 6*c*), depending on the application case, it can be provided for rovings to be laid on the substrate component or the electrically insulating layer side by side without overlaying, and for said rovings to be fastened to said substrate component or the electrically insulating layer in order to form a ribbon of rovings. However, it can also be provided for rovings to overlap in sections in this step, i.e. for rovings to be placed one on top of the other in sections when viewed in the thickness direction of the heating layer.

Furthermore, it can be provided for the steps 6*b* and 6*c* to alternate in order to, when viewed in the direction of thickness of the heating layer, sequentially lay a layer comprising rovings R, an electrically insulating layer and again at least a combination comprising a layer of rovings R and/or of a ribbon and/or of a bundle of rovings and an electrically insulating layer. In this approach it can, in particular, be provided for the respective further layer of rovings R to be sewn or embroidered onto the electrically insulating layer that in each case has additionally been laid onto a layer of rovings R.

The electrically insulating layer, provided according to the invention, on the substrate component of the component or of the semi-finished component to be produced can in particular comprise glass, aramid or plastic materials. The electrically insulating layer can be applied to the semi-finished component or the substrate component as a separate layer, and can, for example be bonded on. If production of the substrate component takes place in a plastic production method, it can be provided for the substrate component to be produced together with the electrically insulating layer as a single-piece component in the plastic production method.

After laying the layer of electrically conductive rovings R or of the bundles or of the at least one ribbon B of rovings R onto a substrate component, in step 7 contacting of the end sections of the rovings comprising electrically conductive fibres can take place, for example by connecting a metallic contact body to the end sections of the rovings by means of an electrically conductive adhesive which, for example, comprises metal.

In an alternative exemplary embodiment of the invention, laying the electrically conductive rovings or bundles or ribbons of rovings onto a substrate component whose surface is three-dimensionally definable can already be provided in step S6. In this arrangement the design of the substrate component is, however, to be provided in such a manner that its surface comprises a shape that can be unwound. In this context the term "unwindable application surface" refers in particular to a three-dimensional surface which can be transformed to a plane without there being an inner change in shape, i.e. true rendering of length. Conversely, in this context the term "non-unwindable application surface" refers to a shape of the application surface which is curved in two dimensions. In this case the application surface can at least in some regions, for example, be spherical in shape, ellipsoid in shape, or be shaped in the manner of a saddle surface. According to the laying, described in this document, of the layer comprising electrically conductive rovings, again contacting of end sections of the rovings takes place according to step S7.

In step S7, according to the invention, of contacting the carbon fibres of the laid electrically conductive material, a connection of a metallic contact body with the end sections of the electrically conductive rovings takes place, which rovings end on the boundary side or on the boundary cross section and comprise end surfaces. Preferably, the rovings have been laid onto the substrate component in such a manner that, for the purpose of contacting, their ends extend beyond the substrate component. In this arrangement a current conducting, and in particular a metallic, contact body is electrically connected to the end sections of the electrically conductive rovings. The contact body can, in particular, be panel shaped or foil shaped in order to prevent, when current is fed to the electrically conductive rovings, the occurrence of excessive electrical contact resistance and the associated locally high currents. The contact body can, in particular, be a copper foil. The connection between the contact body and the electrically conductive rovings can take place by means of an adhesive that comprises metal. In this arrangement the metal contained in the adhesive can be in the form of metal particles. The substrate material of the adhesive can, in particular, comprise an electrically conductive polymer.

If the contacting positions have been specified or calculated in the laying method (steps 1 and 2), said positions are to be provided according to this specification or calculation.

Completion or stabilisation of the heating structure with electrically non-conductive materials to electrically insulate the carbon-fibre heating structure can take place in various ways, for example with the use of binder material or by corresponding sewing. In this arrangement, prior to carrying out a resin infusion method or resin injection method a binder process for fixing at least one layer of electrically conductive rovings or of the bundles or ribbons of rovings and of one layer of electrically non-conductive material is provided.

Furthermore, it is provided for an insulation layer for electrically insulating the layer of electrically conductive rovings to be laid onto the layer, laid onto the substrate component, which layer comprises electrically conductive rovings or bundles or ribbons of rovings.

According to a further exemplary embodiment, it is additionally provided for a lightning protection material to be laid onto the bound arrangement comprising at least one layer of electrically conductive rovings, the binder material and the insulation layer. The lightning protection material can, in particular, be a stamped foil, a fabric, netting or a lattice structure comprising electrically conductive metallic and/or non-metallic material.

The bound arrangement comprising at least one layer of electrically conductive rovings, the binder material and the insulation layer as well as if applicable the lightning protection material is, in particular, provided in such a manner that this bound arrangement forms an adequately stable configuration so that this stable configuration can be removed from the draping tool and in a second, downstream, process on a heatable moulding tool and/or on a non-heatable moulding tool can be brought into an oven or can be fed to an oven, in which oven the binder process can be carried out. Consequently, prior to carrying out a resin infusion method or resin injection method a binder process for fixing at least one layer of electrically conductive rovings is carried out.

As an alternative or in addition it can be provided for several separate heating structures comprising an electrically conductive rovings, which are designed as a separately controllable electrical resistance, to be laid onto the substrate component. This can be provided both in the single-stage and in the two-stage laying of the at least one layer of electrically conductive rovings. In this arrangement at least one insulation layer is laid between two respective layers comprising electrically conductive rovings.

According to an exemplary embodiment for producing a semi-finished heating body comprising several layers and/or separate heating structures comprising electrically conductive rovings, thus a layer comprising electrically conductive rovings R is laid onto a substrate component that is located on a first tool, and said layer is contacted in a manner as described. Subsequently, this layer comprising electrically conductive rovings R is laid onto a second tool that comprises a surface which differs from the surface of the first tool, and in particular comprises a shape that is to be defined as being three-dimensional. After this, an insulation layer is laid onto the layer, laid onto the second tool, which layer comprises electrically conductive rovings R. According to this exemplary embodiment, these steps can be repeated once or multiple times so that then several layers comprising electrically conductive rovings R, in each case separated by an insulation layer, are in place on the second tool. Optionally, thereafter, in this exemplary embodiment the binder material and optionally the lightning protection material are applied. When binder material is used, if applicable this is then followed by the binder process and the implementation of a resin infusion method or a resin injection method.

According to a further exemplary embodiment, for producing a semi-finished heating body comprising several layers of electrically conductive rovings or bundles or ribbons of rovings, thus a first layer of electrically conductive rovings or bundles or ribbons of rovings is first laid onto a substrate component that is situated on a first tool, and the aforesaid are contacted in a manner described. After this, an insulation layer is laid onto the layer, laid onto the second tool, which layer comprises electrically conductive rovings. According to this exemplary embodiment these steps can be repeated once or multiple times so that then several layers comprising electrically conductive rovings, in each case separated by an insulation layer, are in place on the second tool.

The semi-finished product comprising a semi-finished substrate component with an electrically insulating layer, to which the rovings or bundles or ribbons of rovings have been applied, is subsequently laid onto a tool comprising a three-dimensional supporting-surface contour (step S8). The tool comprising the three-dimensional supporting-surface contour can be the same tool in which the semi-finished substrate component was clamped when the rovings or bundles or ribbons of rovings were applied to the semi-finished substrate component.

Contacting the rovings R or the ribbon of rovings R (step 7) can also take place after step 8.

According to the method according to the invention, it is thus in particular provided that in the laying of electrically conductive rovings or of the at least one bundle or ribbon of rovings onto the substrate component (step S6) the substrate component has a two-dimensionally definable surface, and that before or after contacting end sections of the rovings or of the at least one bundle or ribbon of rovings laying of the semi-finished product combination of substrate component and of the electrically conductive rovings laid thereon takes place on a moulding tool whose surface has a three-dimensionally definable shape.

Optionally, thereafter, in this exemplary embodiment the binder material and optionally the lightning protection material are applied (step S8). As an alternative or in addition, it can be provided for the binder material in one of the preceding steps to have been contained in the semi-finished substrate component and/or in the electrically insulating layer and/or in the rovings, applied thereon, or in the at least one bundle or ribbon of rovings applied thereon. When binder material is used, if applicable this is then followed by the binder process (step S9) for stabilising the semi-finished product, and the implementation of a resin infusion method or a resin injection method (step 10).

In a further step the bound arrangement, which has come into being according to one of the described embodiments of method-related steps, comprising at least one layer of electrically conductive rovings, the binder material and the insulation layer as well as if applicable the lightning protection material is consolidated in a resin infusion process and/or resin injection process with the use of a resin (step 10). In this arrangement it can be provided, in first process steps, for the substrate component and the electrically insulating layer in each case to be laid on as dry semi-finished products, and for the electrically insulating layer to be produced in a single piece in a plastic production method.

Subsequently, it can be provided for the cured semi-finished heating structure to be reworked in a machining process (step S11).

Thereafter, connection of the electrical lines to the metallic contact body can take place (step S12).

Furthermore, thereafter a functional check by means of thermography imaging can be provided (step S13). In this arrangement it can be provided for the functionality of the heating structure to be verified by thermal imaging. By means of thermal imaging, integral evidence relating to the temperature distribution at the surface of the heating structure is obtained, and consequently the heating speed in the individual heating zones can be demonstrated. With this thermography method, by recognising hotspots, imperfections on contact locations comprising carbon/metal or carbon fibre/carbon fibre can be detected.

According to the invention, with the method described above, a component comprising at least one electrothermal heating layer is produced. The at least one electrothermal additional heating layer 10, 11, 12 comprises in particular: a plurality of rovings R comprising electrical conductors, wherein the plurality of rovings are arranged in such a manner that the plurality of rovings R are distributed in a sheet-like manner over the heating layer 11, 12, and electrical connecting devices 11a, 11b; 12a, 12b for connecting the heating layer 10, 11, 12 to an energy supply device E10, E11, E12. In this arrangement the plurality of rovings R can, in particular, form at least one ribbon B of rovings R, wherein the at least one ribbon B of rovings R is arranged in such a manner that it is distributed in a sheet-like manner over the heating layer 10, 11, 12. The electrical conductors of the rovings R can be carbon conductors or can comprise carbon conductors, wherein the at least one ribbon B of rovings R is arranged in such a manner that said ribbon B is distributed in a sheet-like manner over the heating layer 10, 11, 12. In particular, the respectively used roving R can comprise carbon filaments that extend in the rovings R parallel to each other and at least in some sections in longitudinal direction of the rovings R.

In this arrangement the heating layer can be designed in such a manner that the rovings R extend in a meandering manner within the at least one electrothermal heating layer 10, 11, 12. In this arrangement, when viewed in its direction of thickness, the electrothermal heating layer 10, 11, 12 can comprise a layer of at least one ribbon B of rovings R.

Generally speaking, the electrothermal heating layer 10, 11, 12 can also comprise metallic conductors in addition to the carbon conductors.

Figure 10:
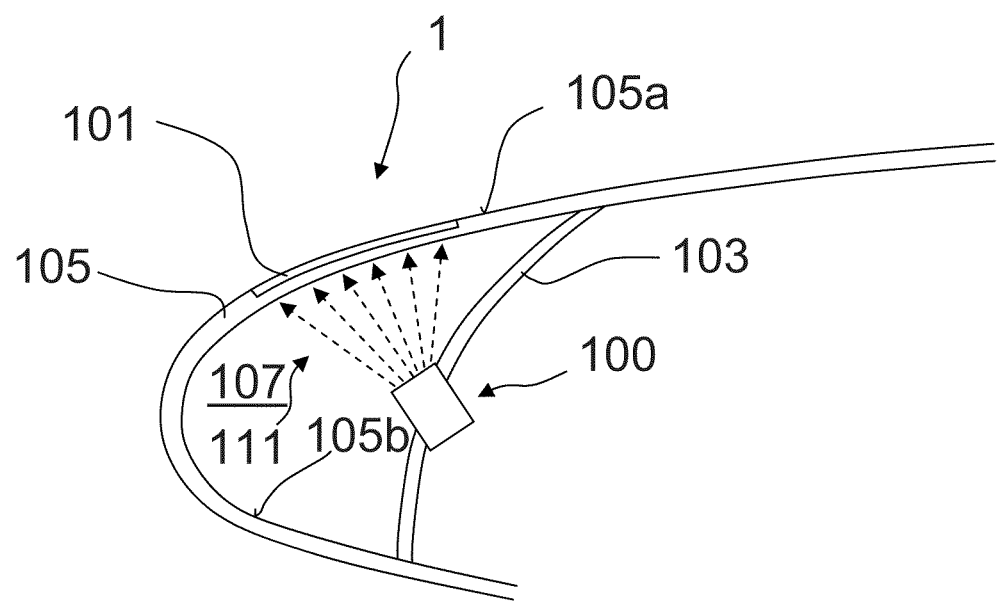

FIG. 10 shows a leading-edge flap of an aircraft on which two arrangements each comprising several heating layers according to the invention are arranged. FIG. 9 shows an exemplary embodiment of the invention comprising a structural component 1 of an aircraft with a substrate component 3 and a shell component 5 comprising an exterior surface 105a subjected to airflow, and an inner region 107. In the illustration of FIG. 10 the structural component 1 is a leading-edge flap of an aircraft. The structural component 1 of the aircraft is in particular a component that comprises a surface which is directed against the airflow which flows around the aircraft in flight. In this arrangement the structural component can be the leading edge of a wing, of a tailplane, or of a leading-edge flap of a wing. Accordingly, the structural component comprises an exterior shell or a shell component 5 with an outside that is subjected to airflow, and an interior surface 105b that is situated opposite the exterior surface 105a.

According to the invention, a temperature measuring device in the form of a pyrometer or radiation thermometer 100 is arranged in the inner region 107 of the structural component 1. The pyrometer 100 can, in particular, be a thermography camera.

The radiation receiver receives the thermal radiation which emanates from the internal surface 105b of the shell component, with the intensity of said thermal radiation depending on its temperature on the internal surface 5, and on the basis of the thermal radiation generates sensor values for determining the temperature of the internal surface 105b of the shell component 105. If the internal surface 105b of the shell component 105, which internal surface 105b faces the pyrometer 100, is colder than the radiation receiver of the pyrometer 100, the radiation flow is negative, i.e. the radiation sensor of the pyrometer 100 gives off thermal radiation to the internal surface 105b, and vice versa. Determining the temperature of the internal surface 105b of the shell component 5 can, in particular, take place on the basis of the emissivity c of the internal surface 105b, in other words on the basis of the ability of the internal surface 105b to emit heat.

The pyrometer 100 is directed towards the internal surface 105b of the shell component 105 in order to measure the thermal radiation that emanates from a region of the internal surface 105b of the shell component 5, thus being able to acquire the temperature of the shell component 105. For this purpose the pyrometer 100 is arranged on the substrate component 103 at a suitable distance to the internal surface 5b. The substrate component 3 can form part of the structural component 1 or of an additional component on said structural component 1 and is designed in such a manner that the pyrometer 100 can be arranged in a suitable position and orientation relative to the internal surface 105b or to a region of said internal surface 105b. Furthermore, the pyrometer 100 can be attached to the substrate component in such a manner that the orientation and/or the position of the pyrometer 100 are/is adjustable. In this context the term "orientation" refers to the rotary position of the pyrometer 100 relative to the internal surface 105b.

Furthermore, the temperature measuring device comprises a sensor-value processing device which acquires temperature values from the sensor values acquired by the pyrometer 100. The sensor-value processing device is functionally connected to the pyrometer 100 by way of a signal line and can be arranged so as to be remote of the pyrometer 10. In particular, the sensor-value processing device can be integrated in a flight control device.

The sensor-value processing device can comprise a comparison function that compares the temperature values with at least one comparison value and sends a signal value to a system function when the limiting value is reached or not achieved. The limiting value can, in particular, correspond to a lower temperature value that is defined in such a manner that at this temperature ice formation on the exterior surface 105a of the shell component 105 is possible or probable.

As an alternative or in addition, the sensor-value processing device can comprise a monitoring function which for the purpose of determining the possibility of ice forming on the exterior surface 105a is designed in such a manner that it receives air data and in particular data relating to the external temperature, the flight altitude and/or the air pressure, and with the sensor values determines the probability limiting value relating to the probability of ice formation occurring. In this exemplary embodiment the sensor-value processing device comprises a comparison function which compares the determined probability value relating to ice formation to a setpoint probability value relating to ice formation to determine the maximum permitted probability of ice formation, and when the setpoint probability value is exceeded sends a signal value as a warning signal to a system function, for example to a flight control system or a cockpit display. The cockpit display can be designed in such a manner that it indicates to the pilot that the flight state should be changed and in so doing the flight altitude needs to be reduced in order to prevent the formation of ice on the shell component 105.

On the shell component 105 a heating device can be arranged to prevent ice formation on the shell component 105. In this exemplary embodiment the system function can be designed in such a manner that said system function switches the heating device on when a limiting value that corresponds to a predetermined probability of ice formation on the shell component 105 is exceeded.

Figure 11:
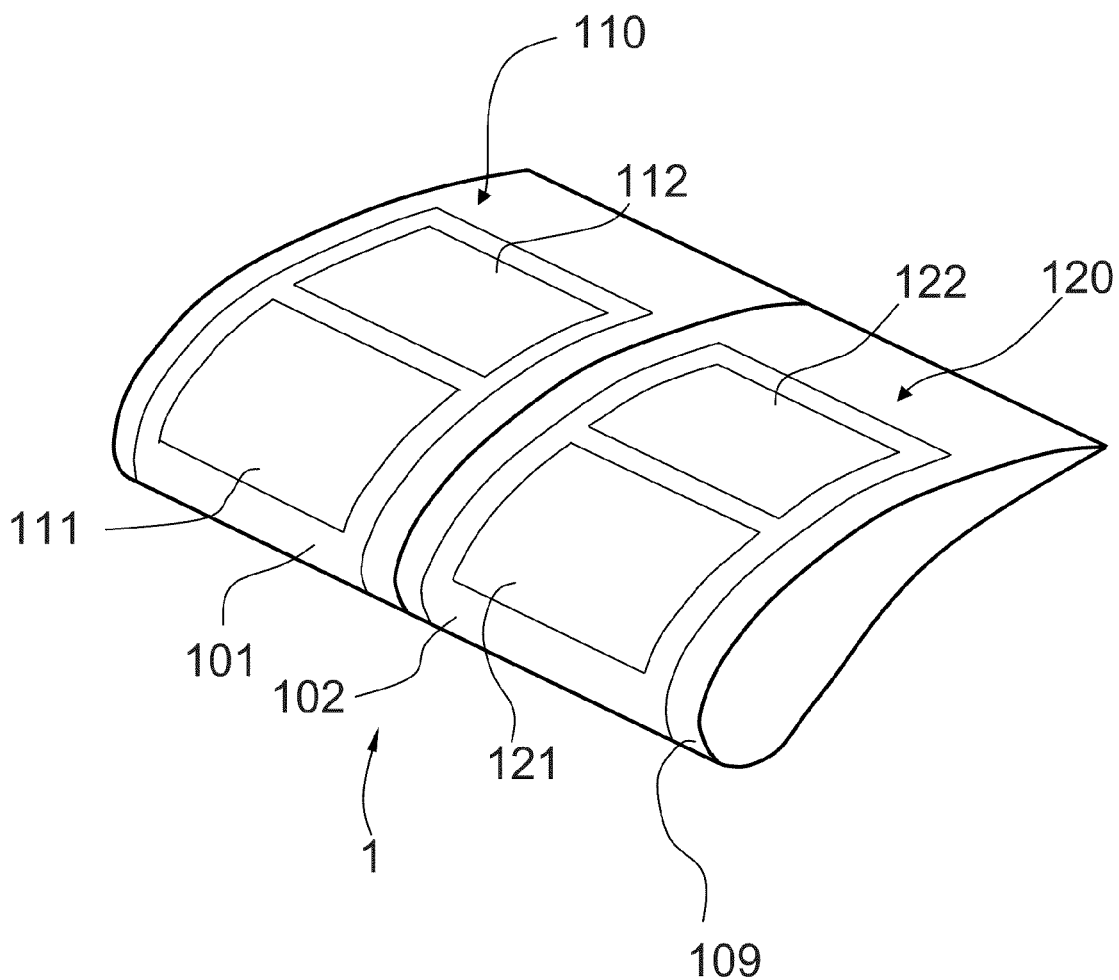

FIG. 11 shows an embodiment of the structural component, or component according to the invention, of an aircraft. The component is designed as a front of a leading-edge flap of a wing. Merely with a different shape of the component this embodiment can also be the front of a main wing, of a horizontal stabiliser or of some other flap or of a vertical stabiliser and, generally speaking, of an aerodynamic body. At its surface the component comprises several electrothermal heating layers, which on the basis of corresponding control by the energy supply device (not shown) give off heat in order to in this way prevent the formation of ice on the surface of the component. The number and size of the heating layers, the arrangement of said heating layers on a surface of the component 1, and the electrical design of the heating layers and of the energy supply device depend on the application case and in each instance need to be adapted to said application case. Generally speaking, in this exemplary embodiment of the invention the surface comprises at least one heating layer.

In the exemplary embodiment specifically shown in FIG. 11, two heating layer arrangements H1, H2 each comprising a base heating layer 101 or 102 and a plurality of inner heating devices or additional heating layers 111, 112 or 121, 122 that are arranged within the respective base heating layer 101, 102 are integrated in a surface 103 of the component 1 or of a base body 4, which component 1 in the exemplary embodiment shown is a shell component 4 of the leading-edge flap 1.

The base heating layers 101, 102 and the additional heating layers 111, 112 or 121, 122 are designed and arranged in such a manner that the base heating layer encloses the first and the second additional heating layers in a sheet-like manner. The heating layers are designed according to an exemplary embodiment of the invention. For this purpose it is, in particular, provided for the base heating layer to comprise two recesses, wherein in the first of the recesses the first additional heating layer 111 or 121 is situated, and in the second of the recesses the second additional heating layer 121 or 122 is situated. Each of the heating layers is supplied with current by the energy supply device. The base heating layer 101 which comprises an electrothermal layer is connected to the energy supply device by way of an electrical connecting device by means of electrical lines. Furthermore, the two additional heating layers 111, 112 are also connected to the energy supply device, in each case by way of an electrical connecting device. Thus the base heating layer 110 and the two additional heating layers 111, 112 arranged within said base heating layer 110 can in various functions be supplied with current by the energy supply device so that according to this supply of current the heating layers 110, 111, 112 give off heat to the component to which the heating layers 110, 111, 112 are attached.

The energy supply device can, in particular, be functionally designed in such a manner that in an activation phase, current is permanently supplied to the heating device of the base heating layer 110, 120, and current is alternately supplied in a predetermined manner to the first 111 or 121 and to the second 112 or 122 additional heating layers, so that the first 111 or 121 and the second 112 or 122 additional heating layers generate heat in a time alternating manner. In this way a heat effect of the surface of the entire heating device 110 or 120 takes place in an efficient manner in energy terms.

Generally-speaking, a heating device 110, 120 can comprise only one additional heating layer that can be situated inside or outside the base heating layer. In this general exemplary embodiment the function for controlling a heating phase of the entire heating system can be designed in such a manner that, in the heating phase of the heating system, current is supplied permanently and, for example, at a largely constant intensity (within a bandwidth of 10 per cent of an average value) to the base heating layer 110, 120, for the purpose of heating the base heating layer 110, 120, and that within the same heating phase in first periods of time electrical current flows through the additional heating layer, which electrical current is stronger than the current that flows through the base heating layer 110, and that the first periods of time alternate with second periods of time, in which no electrical current or a current that is lower than the current flowing through the base heating layer 110 flows in the additional heating layer.

In particular, the additional heating layers of a heating system can be controlled in a time-alternating manner or in a manner in which they supplement each other so that they generate heat alternately.

Consequently, efficient heating, in energy terms, of a surface on an aircraft component can take place.

In a further exemplary embodiment it is also possible for only one base heating layer or for several base heating layers without an additional heating layer to be integrated in the component.

The shell component 105 can, in particular, comprise a fibre-reinforced material (FRM) or a fibre reinforced plastic (FRP). The heating layers, which are provided depending on the embodiment, are arranged on an electrically non-conductive layer so that the heating layers are insulated from the remaining sections of the shell component.

The at least one heating layer arranged on the component preferably comprises a carbon material that is electrically connected by way of electrical connecting devices, and conducts current when a corresponding voltage is applied, so that it can correspondingly be heated. In particular, the at least one heating layer can comprise electrically conductive rovings in a predetermined structure and density, or can comprise a bundle or a compound structure or ribbon of rovings.

In this context the term "roving" refers to a bundle comprising endless carbon filaments or electrically conductive cables that can be contained in the roving in a non-rotated and/or stretched manner. In this arrangement the cables can, in particular, comprise electrical conductors, for example metallic conductors, encased by means of glass fibres. The electrically conductive individual filaments can comprise carbon filaments and/or carbon fibres and/or metallic alloys and/or glass fibres, for example with a metallic coating. Furthermore, the rovings can, in particular, exclusively comprise fibres, and in particular carbon fibres. The rovings can be provided with or without matrix material. In this arrangement materials in the form of endless rovings, endless yarns, endless twisted yarns, endless strings, endless knitted fabrics, endless woven materials, endless cords or endless knit fabrics can be used for the rovings used according to the invention. For use with the method according to the invention, such endless rovings can be wound on reels or drums in order to remove from them rovings in suitable lengths for application in the method according to the invention.

In order to form the heating layer, rovings can be arranged as individual rovings or as at least one compound structure or one ribbon of rovings. In this context the term "ribbon of rovings" refers to an arrangement of rovings which extend in their longitudinal direction side by side, which rovings, thus, when viewed in the direction of thickness of the heating layer, at none of their longitudinal sections are placed one on top of the other. In this context the term "compound structure of rovings" refers to an arrangement of rovings which in their longitudinal direction extend side by side or one on top of the other, which rovings thus, when viewed in the direction of thickness of the heating layer, are at least on one of their longitudinal sections placed one on top of the other.

In each case an electrically conductive connecting piece can be connected to the end pieces of the roving, which end pieces are situated in longitudinal direction of the roving, by means of which connecting piece in turn the electrical lines are interconnected and connected to the energy supply device. Consequently, by means of the control function of the energy supply device current can flow through the roving at a predetermined current intensity and in a predetermined time period in order to heat said roving and thus the component on which the roving is arranged. In principle, when viewed in the direction of thickness of the component, several rovings can be arranged one on top of the other, which rovings can extend parallel to each other or in a contrary direction to each other.

The rovings or the at least one bundle or ribbon of rovings can extend parallel to each other and in an oscillatory manner. In principle, when viewed in the direction of thickness of the component, several rovings can be arranged one on top of the other, which rovings can extend parallel to each other or in a contrary direction to each other. Other forms, in which rovings or at least one bundle or ribbon of rovings can be arranged to form a heating layer of a heating system, are to be provided according to the requirements of the respective application case.

With the use of at least one heating system on the component 1 according to the above-mentioned exemplary embodiments, the system function that is functionally coupled to the sensor-value processing device can continue to be designed as a regulating function for regulating the temperature of the region of the shell component 105, which region is acquired by the pyrometer 100. In this arrangement the system function receives from the sensor-value processing device the temperature values that were determined from sensor values of the pyrometer 100, and compares the aforesaid with a reference value or a temperature as a regulating variable. This reference value or temperature value is above a temperature at which ice formation on the shell component 105 can occur or at which such ice formation can be prevented. The regulating function is functionally connected to the sensor-value processing device and from it receives the temperature values as input variables that were determined from sensor values of the pyrometer 100. Furthermore, the regulating function controls the energy supply device in such a manner that the at least one heating layer is heated in such a manner that the region of the shell component, which region is acquired by the pyrometer 100, adheres to a setpoint temperature if at all possible. Thus, on the basis of a setpoint temperature, the regulating function generates corresponding command signals relating to the region of the shell component 105, which region is acquired by the pyrometer 100, which command signals are transmitted to the energy supply device which in a corresponding manner applies current to the at least one heating layer. If several heating layers are present it is also possible to control several heating layers in order to regulate the temperature at the region of the shell component 105, which region is acquired by the pyrometer 100.

With the use of at least one heating system according to the above-mentioned exemplary embodiments, the system function can furthermore be designed in such a manner that in those cases where the heating device is switched on, and at the same time the limiting value that corresponds to the probability of ice formation on the shell component 105 is exceeded, said system function issues a warning signal. The heating device can be designed in such a manner that it can generate various heating levels, i.e. various levels of releasing heating output. In this case the system function can, in particular, be designed in such a manner that the warning signal is generated when the highest heating level of the heating device is operative, at which level the maximum thermal output is generated, while at the same time a limiting value that corresponds to the probability of ice formation on the shell component 5 is exceeded. The warning signal can be sent to a flight guidance display, and the latter can be designed in such a manner that it generates a recommendation, e.g. in the Flight Director, for the pilot, according to which recommendation the aircraft is to be brought to a flight state in which ice formation on the wing is avoided. As an alternative or in addition, it can be provided for the warning signal to be sent to a flight control device that comprises a control function by means of which the aircraft is brought to a flight state in which ice formation on the wing is avoided.

The warning signal can mean that the electrothermal heating body is defective. In an exemplary embodiment of the invention it can thus be provided for the monitoring function to determine whether the atmospheric conditions during failure of the electrothermal heating body can signify a critical situation for the aircraft. It can be provided that in an evaluation function the flight altitude and optionally the measured air temperature are used. If applying the evaluation function shows that from the inadmissible (i.e. excessive) probability of ice formation a critical flight situation can result, a warning is sent to the flight control system or to the cockpit display which displays to the pilot recommendations for action by means of which the pilot can bring the aircraft to a safer flight state. In this context it can, for example, be displayed that the flight state needs to be changed and in so doing, in particular, the flight altitude needs to be reduced in order to prevent ice formation on the wing. As an alternative or in addition it is also possible for an automatic control function to be realised, which control function automatically implements these measures.

The pyrometer 100 can be a total radiation pyrometer that acquires the radiation of a measuring surface across the entire spectral range, or a band radiation pyrometer, whose lenses, window and radiation sensor in each case operate only in a limited wavelength range.

As an alternative, the pyrometer 100 can be a quotient pyrometer, ratio pyrometer or 2-colour-pyrometer, which acquires the ratio of the intensities of two different "colours", so that the temperature of the internal surface 5b is not determined on the basis of the brightness but rather on the basis of the colour of the radiation. Furthermore, a "coating" or an application of a material with a defined emission coefficient can be applied to the interior of the structural component, because the measured temperature is strongly influenced by the aforesaid. As an alternative it can be provided for the emission coefficient to be determined from the surface. In these cases the respective emission coefficient is taken into account in the evaluation function for evaluating the acquired measuring values. The evaluation function can, furthermore, be designed in such a manner that it does not take into account further heat radiators, which in particular as a result of reflections have an influence on the measured temperature on the inside of the structural component, or that said measuring device excludes the above, i.e. compensates for them.

Furthermore, the shell component 105 can be designed in such a manner that its internal surface 5b is not greatly, or only to a small extent, wavelength-dependent.

Moreover, it can be provided for a colour of the internal surface 5b to be determined as a reference colour or comparison value which corresponds to the probability of ice formation, and which value must be achieved. The evaluation function that has been allocated to the pyrometer can in this case comprise a comparison function which compares the respectively determined colour of the internal surface 105b with the reference colour and generates a signal when the value for the reference colour is exceeded. This exemplary embodiment provides an advantage in that the degree of emission of the internal surface 5b during determining the temperature of said internal surface 5b does not matter and does not have to be acquired. When forming the ratio for measuring, it does not matter if the emissivity of the material to be measured is not strongly wavelength-dependent.

In an exemplary embodiment, the pyrometer 100 is designed as a narrow-band pyrometer that evaluates only a small part of the radiation spectrum, which small part, by means of a filter, has been reduced to a particular wavelength range. In this arrangement the radiation spectrum is designed in such a manner that it describes a range of temperatures on the internal surface 105b, at which temperatures ice formation on the shell component 105 is probable.

The respective sensor values or ranges, which correspond to the probability of ice forming on the exterior surface 105a of the shell component, are, in particular, defined on the basis of tests.

In particular, thermal detectors (e.g. bolometers, pyroelectric sensors or thermopiles, which comprise thermoelements) or photoelectric detectors or photodiodes are provided as a radiation sensor or detector of the pyrometer 100.

According to an exemplary embodiment, thus a structural component of an aircraft with a substrate component 103 and a shell component 105 is provided, which structural component comprises an exterior surface, subjected to airflow, and an inner region 107. In this arrangement the structural component further comprises at least one electrothermal heating body, arranged on the shell component, which heating body can be supplied with current by an energy supply device that is electrically connected to said heating body. As a result of the heating body being heated, the shell component 105 is heated in order to prevent ice formation on it, or in order to achieve de-icing of it. Furthermore, a pyrometer 100 is provided, which in the inner region 107 is arranged on a substrate component 103 of the structural component 1 and is directed towards the shell component 105.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A structural component comprising a heating system with at least one energy supply device, wherein the heating system comprises:

a base heating device comprising an insulation layer, with an electrothermal base heating layer arranged thereon which comprises at least one bundle of rovings, or at least one compound structure of rovings, or at least one ribbon of rovings, and with an electrical connecting device connecting at least one energy supply device to the base heating layer, wherein the ends of each roving in each case are connected to an electrode of the electrical connecting device, an additional heating device comprising an insulation layer with an electrothermal additional heating layer arranged thereon which comprises at least one bundle of rovings, or at least one compound structure of rovings, or at least one ribbon of rovings, and with an electrical connecting device connecting the energy supply device to the additional heating layer thereby providing a cohesive heating effect, the base heating device and the additional heating device are spatially associated with each other, and in this arrangement the energy supply device is designed in such a manner that in an activation phase current is supplied during at least a partial period of time to the additional heating layer to heat the structural component in the region of the additional heating layer to a setpoint temperature, and that, above and beyond the activation phase, current is continuously supplied to the base heating layer so that the base heating layer generates heat continuously during operation of the heating system, while the additional heating layer generates heat in the partial period of time.

2. The structural component according to claim 1, wherein the energy supply device supplies current to the additional heating layer at a first period of time in the heating phase at an intensity 50% higher than that of the current supplied to the base heating layer, and wherein during later periods of time in the heating phase, which follow the first period of time, current is supplied to the additional heating layer at an intensity 50% lower than that of the current supplied to the base heating layer.

3. The structural component according to claim 1, wherein the heating system comprises: a further additional heating device comprising an insulation layer with a further electrothermal additional heating layer arranged thereon, and comprising an electrical connecting device, by way of which the energy supply device is connected to the further additional heating layer, wherein the function of the energy supply device for controlling the current in the heating layers is designed in such a manner that, in relation to the current which in each case flows in the additional heating layers, in each additional heating layer first and second periods of time with different current intensities of the heating current form, which periods of time alternate, wherein the current intensities in the respective first heating phases are significantly higher than the current intensities in the respective second heating phases.

4. The structural component according to claim 3, wherein the first electrothermal additional heating layer and the further electrothermal additional heating layer in relation to the sheet-like extension of the base heating layer are arranged within said base heating layer.

5. The structural component according to claim 1, wherein the electrothermal additional heating layers comprise at least one ribbon of rovings which are connected by way of the electrical connecting devices to the energy supply device, which rovings comprise carbon conductors, wherein the at least one ribbon of rovings is arranged in such a manner that it is distributed in a sheet-like manner over the additional heating layers.

6. The structural component according to claim 1, wherein the electrothermal base heating layer comprises at least one ribbon of rovings which is connected by way of the electrical connecting devices to the energy supply device, which rovings comprise carbon conductors, wherein the at least one ribbon of rovings is arranged in such a manner that it is distributed in a sheet-like manner over the base heating layer.

7. The structural component according to claim 5, wherein the roving comprises carbon filaments that extend in the rovings parallel to each other and at least in some sections in longitudinal direction of the rovings.

8. The structural component according to claim 5, wherein the at least one electrothermal additional heating layer comprises at least one ribbon of rovings, which ribbon is connected to the energy supply device by way of the electrical connecting devices, and extends in a meandering manner within the respective heating layer.

9. The structural component according to claim 5, wherein the heating region of the first and/or of the second internal heating device, when viewed in the direction of thickness of the respective heating region, comprises a layer of at least one ribbon of rovings.

10. The structural component according to claim 1, wherein the electrothermal layer comprises metallic conductors.

* * * * *